US010349286B2

(12) United States Patent
Atia et al.

(10) Patent No.: US 10,349,286 B2
(45) Date of Patent: *Jul. 9, 2019

(54) SYSTEM AND METHOD FOR WIRELESS POSITIONING IN WIRELESS NETWORK-ENABLED ENVIRONMENTS

(75) Inventors: Mohamed Atia, Calgary (CA); Aboelmagd Noureldin, Calgary (CA)

(73) Assignee: InvenSense, Inc., San Jose, CA (US)

( * ) Notice: Subject to any disclaimer, the term of this patent is extended or adjusted under 35 U.S.C. 154(b) by 548 days.

This patent is subject to a terminal disclaimer.

(21) Appl. No.: 14/130,274

(22) PCT Filed: Jul. 5, 2012

(86) PCT No.: PCT/CA2012/000633
§ 371 (c)(1),
(2), (4) Date: Jun. 27, 2014

(87) PCT Pub. No.: WO2013/000073
PCT Pub. Date: Jan. 3, 2013

(65) Prior Publication Data
US 2015/0230100 A1    Aug. 13, 2015

Related U.S. Application Data

(60) Provisional application No. 61/503,119, filed on Jun. 30, 2011.

(51) Int. Cl.
*H04W 16/22* (2009.01)
*H04W 16/18* (2009.01)
(Continued)

(52) U.S. Cl.
CPC ........... *H04W 16/22* (2013.01); *H04W 16/18* (2013.01); *H04W 16/20* (2013.01); *H04W 24/02* (2013.01);
(Continued)

(58) Field of Classification Search
CPC ..... H04W 16/18; H04W 16/20; H04W 16/22; H04W 64/003; H04W 24/02; H04W 88/08; H04W 84/12; H04W 4/021; H04W 4/023
(Continued)

(56) References Cited

U.S. PATENT DOCUMENTS 6,148,211 A * 11/2000 Reed ..................... H04W 64/00
                                                              455/456.2
7,406,116 B2    7/2008 Agrawala et al.
(Continued)

OTHER PUBLICATIONS

Gwon et al., "Error Characteristics and Calibration-free Techniques for Wireless LAN-based Location Estimation", Oct. 2004, ACM, Proc. of ACM MobiWac'04, pp. 8.*
(Continued)

*Primary Examiner* — Un C Cho
*Assistant Examiner* — Shah M Rahman
(74) *Attorney, Agent, or Firm* — Bay Area Technology Law Group

(57) ABSTRACT

A system and method for providing wireless positioning and an accuracy measure thereof, using a probabilistic approach alone or in combination with other models, is provided, for wireless-network-enabled areas. Further means of ranking "base-stations" in a wireless network area according to position discrimination significance and using this ranking to provide an accuracy measure of positioning is provided. Further means of determining the locations of "base-stations" of a wireless network in unknown area without the need for any absolute reference based positioning system is provided.

56 Claims, 12 Drawing Sheets

(51) Int. Cl.
*H04W 16/20* (2009.01)
*H04W 24/02* (2009.01)
*H04W 64/00* (2009.01)
*H04W 84/12* (2009.01)
*H04W 88/08* (2009.01)

(52) U.S. Cl.
CPC .......... *H04W 64/003* (2013.01); *H04W 84/12* (2013.01); *H04W 88/08* (2013.01)

(58) Field of Classification Search
USPC ........................................................ 370/252
See application file for complete search history.

(56) References Cited

U.S. PATENT DOCUMENTS

| | | | | |
|---|---|---|---|---|
| 7,660,591 | B1* | 2/2010 | Krishnakumar | G01S 5/0252 342/360 |
| 8,340,684 | B2* | 12/2012 | Miura | H04B 17/318 455/456.1 |
| 2002/0126044 | A1* | 9/2002 | Gustafson | G01C 21/165 342/357.59 |
| 2004/0236547 | A1* | 11/2004 | Rappaport | G06F 17/509 703/2 |
| 2005/0136845 | A1* | 6/2005 | Masuoka | G01S 5/0294 455/67.14 |
| 2005/0243936 | A1* | 11/2005 | Agrawala | H04W 64/00 375/259 |
| 2006/0019679 | A1* | 1/2006 | Rappaport | H04W 64/00 455/456.5 |
| 2006/0239202 | A1* | 10/2006 | Kyperountas | G01S 5/0289 370/252 |
| 2008/0008121 | A1* | 1/2008 | Alizadeh-Shabdiz | G01S 5/02 370/328 |
| 2008/0032706 | A1* | 2/2008 | Sheynblat | G01S 5/0036 455/456.1 |
| 2009/0046013 | A1* | 2/2009 | Yanagihara | G01S 5/021 342/451 |
| 2009/0082034 | A1* | 3/2009 | Gray | H04W 64/00 455/456.1 |
| 2009/0102642 | A1* | 4/2009 | Huseth | G01S 11/06 340/539.13 |
| 2009/0303112 | A1* | 12/2009 | Alizadeh-Shabdiz | G01S 5/0257 342/357.48 |
| 2010/0135178 | A1* | 6/2010 | Aggarwal | G01S 5/0205 370/252 |
| 2010/0265092 | A1* | 10/2010 | Kim | H04W 64/003 340/8.1 |
| 2010/0317390 | A1* | 12/2010 | Rekimoto | H04W 64/00 455/511 |
| 2011/0034179 | A1* | 2/2011 | David | G01S 5/0236 455/456.1 |
| 2011/0170524 | A1* | 7/2011 | Arslan | G01S 5/0252 370/338 |
| 2011/0199889 | A1* | 8/2011 | Han | H04J 13/10 370/210 |
| 2012/0040687 | A1* | 2/2012 | Siomina | G01S 5/0205 455/456.1 |
| 2012/0188938 | A1* | 7/2012 | Venkatraman | H04W 64/003 370/328 |
| 2012/0249300 | A1* | 10/2012 | Avital | H04W 64/00 340/8.1 |
| 2013/0094384 | A1* | 4/2013 | Park | H04B 7/0626 370/252 |
| 2013/0281100 | A1* | 10/2013 | Lanzo | H04W 16/18 455/446 |
| 2013/0310077 | A1* | 11/2013 | Siomina | H04W 4/02 455/456.2 |
| 2015/0172863 | A1* | 6/2015 | Brachet | G01S 5/0236 455/456.1 |

OTHER PUBLICATIONS

Lau et al., "Enhanced RSSI-based Real-time User Location Tracking System for Indoor and Outdoor Environments", 2007, IEEE, DOI 10.1109/ICCIT.2007.253, pp. 1213-1218 (Year: 2007).*
Ibrahim et al., "CellSense: A Probabilistic RSSI-based GSM Positioning System", 2010, IEEE, Globecom, pp. 1-5 (Year: 2010).*
Borenovic et al., "Positioning in Indoor Mobile Systems", 2010, http://www.intechopen.com/books/radio-communications/positioning-in-indoor-mobile-systems, pp. 1-23 (Year: 2010).*
Hyuk Lim et al., "Zero-Configuration Indoor Localization Over IEEE 802.11 Wireless Infrastructure," published Oct. 4, 2008, Wireless Netw (2010) 16:405-420, Springer Science+Business Media, LLC.
Hyuk Lim et al., "Zero-Configuration, Robust Indoor Localization: Theory and Experimentation," Department of Computer Science, University of Illinois, Technical Report No. UIUCDCS-R-2005-2629.
Hyuk Lim et al., "Zero-Configuration, Robust Indoor Localization: Theory and Experimentation," Department of Computer Science, University of Illinois.

* cited by examiner

|  | 120 A RSS | 120 B RSS | 120 C RSS | 120 D RSS | 120 E RSS | 120 F RSS | 120 G RSS |
|---|---|---|---|---|---|---|---|
| Location of 120 A | $RSS_A^{(A)}$ | $RSS_B^{(A)}$ | $RSS_C^{(A)}$ | $RSS_D^{(A)}$ | $RSS_E^{(A)}$ | $RSS_F^{(A)}$ | $RSS_G^{(A)}$ |
| Location of 120 B | $RSS_A^{(B)}$ | $RSS_B^{(B)}$ | $RSS_C^{(B)}$ | $RSS_D^{(B)}$ | $RSS_E^{(B)}$ | $RSS_F^{(B)}$ | $RSS_G^{(B)}$ |
| Location of 120 C | $RSS_A^{(C)}$ | $RSS_B^{(C)}$ | $RSS_C^{(C)}$ | $RSS_D^{(C)}$ | $RSS_E^{(C)}$ | $RSS_F^{(C)}$ | $RSS_G^{(C)}$ |
| Location of 120 D | $RSS_A^{(D)}$ | $RSS_B^{(D)}$ | $RSS_C^{(D)}$ | $RSS_D^{(D)}$ | $RSS_E^{(D)}$ | $RSS_F^{(D)}$ | $RSS_G^{(D)}$ |
| Location of 120 E | $RSS_A^{(A)}$ | $RSS_A^{(A)}$ | $RSS_A^{(A)}$ | $RSS_A^{(A)}$ | $RSS_E^{(E)}$ | $RSS_A^{(A)}$ | $RSS_A^{(A)}$ |
| Location of 120 F | $RSS_A^{(F)}$ | $RSS_B^{(F)}$ | $RSS_C^{(F)}$ | $RSS_D^{(F)}$ | $RSS_E^{(F)}$ | $RSS_F^{(F)}$ | $RSS_G^{(F)}$ |
| Location of 120 G | $RSS_A^{(G)}$ | $RSS_B^{(G)}$ | $RSS_C^{(G)}$ | $RSS_D^{(G)}$ | $RSS_E^{(G)}$ | $RSS_F^{(G)}$ | $RSS_G^{(G)}$ |

|  | 610 RSS | 620 RSS | 630 RSS | 640 RSS | 650 RSS |
|---|---|---|---|---|---|
| Location of 610 | $RSS_{610}^{(610)}$ | $RSS_{620}^{(610)}$ | $RSS_{630}^{(610)}$ | $RSS_{640}^{(610)}$ | $RSS_{650}^{(610)}$ |
| Location of 620 | $RSS_{610}^{(620)}$ | $RSS_{620}^{(620)}$ | $RSS_{630}^{(620)}$ | $RSS_{640}^{(620)}$ | $RSS_{650}^{(620)}$ |
| Location of 630 | $RSS_{610}^{(630)}$ | $RSS_{620}^{(630)}$ | $RSS_{630}^{(630)}$ | $RSS_{640}^{(630)}$ | $RSS_{650}^{(630)}$ |
| Location of 640 | $RSS_{610}^{(640)}$ | $RSS_{620}^{(640)}$ | $RSS_{630}^{(640)}$ | $RSS_{640}^{(640)}$ | $RSS_{650}^{(640)}$ |
| Location of 650 | $RSS_{610}^{(650)}$ | $RSS_{620}^{(650)}$ | $RSS_{630}^{(650)}$ | $RSS_{640}^{(650)}$ | $RSS_{650}^{(650)}$ |

|  | 610 RSS | 620 RSS | 630 RSS | 640 RSS | 650 RSS |
|---|---|---|---|---|---|
| Location 1 | $RSS_{610}^{(1)}$ | $RSS_{620}^{(1)}$ | $RSS_{630}^{(1)}$ | $RSS_{640}^{(1)}$ | $RSS_{650}^{(1)}$ |
| Location 2 | $RSS_{610}^{(2)}$ | $RSS_{620}^{(2)}$ | $RSS_{630}^{(2)}$ | $RSS_{640}^{(2)}$ | $RSS_{650}^{(2)}$ |
| ⋮ | ⋮ | ⋮ | ⋮ | ⋮ | ⋮ |
| Location N | $RSS_{610}^{(N)}$ | $RSS_{620}^{(N)}$ | $RSS_{630}^{(N)}$ | $RSS_{640}^{(N)}$ | $RSS_{650}^{(N)}$ |

1200

1210

SYSTEM AND METHOD FOR WIRELESS POSITIONING IN WIRELESS NETWORK-ENABLED ENVIRONMENTS

TECHNICAL FIELD

A system and method for providing improved wireless positioning in wireless local area network (WLAN) enabled areas is provided. More specifically, a system and method for providing wireless positioning, including calculating the position of a wireless-network-enabled device and an accuracy measure thereof, in areas having WLAN coverage, but having weak or no reference-based positioning system coverage, such as indoor areas, is provided.

BACKGROUND

Satellite-based positioning systems, such as Global Navigation Satellite Systems (GNSS), are commonly used to provide accurate positioning. However, the accuracy of such systems significantly deteriorates where satellite signals are weak or blocked, such as in dense urban areas or indoors. As a result, alternative positioning techniques that can provide strong coverage (e.g. electromagnetic wireless signals) in environments where access to reference-based positioning is degraded or denied have been developed. One such system comprises IEEE 802.11 Wireless Local Area Network (WLAN), and is commonly referred to as "Wi-Fi".

Wireless positioning depends upon the characteristics and quality of transmitted wireless signals, and sub meter-level accuracy can be obtained where the signal characteristics (e.g. signal power, direction and travel time) are of sufficient quality. For example, "time-based" wireless positioning systems, which depend upon signal time of flight from signal transmitters to receivers, can provide accurate positioning where the time of signal flight portrays an accurate indication of the distance between the transmitters and receivers and if a clear line-of-sight exists. Similarly, "direction-based" wireless positioning systems, which depend upon the "direction of arrival" or "angle of arrival" of the transmitted signal arriving at the receiver, are also used where there is a clear line-of-sight. However, such systems fail where there is no clear line-of-sight, or where the signal is reflected or refracted on different surface types (i.e. a "multipath effect")

In an attempt to overcome multipath effects, "signal-strength-based" wireless positioning systems, which depend upon the strength of the signal received, have been developed. Such systems generally utilize modeling method to either map the signal strength received from a plurality of transmitters:

a) to a particular distance from the transmitters (e.g. a propagation model), or b) directly to a location using a pre-collected radio survey database ("radio map"), whereby the radio map references known locations in the area and corresponding received signal strength patterns.

One problem associated with the foregoing "signal-strength-based" systems that utilize a propagation model in indoor areas is the indifference to direction of the received signal arriving at the receiver. Where the area is complex in nature, signal attenuation with distance may not be the same in all directions. Attempts to remedy this problem have been to incorporate additional hardware, such as directional antennas, into the environment. However, the additional hardware requirement can be costly, and is not feasible or practical in all scenarios.

Another problem associated with "strength-based" systems is the dependency upon pre-calibrated or offline-trained models before such systems can be used. Data collection and training offline require additional time and effort by the user. Although it is possible to automate these processes such as, for example, incorporating additional hardware for automated data collection (e.g. using wireless monitors or mobile robots), the additional hardware is costly, and is not feasible or practical in all locations.

Current wireless positioning systems are also plagued with the fact that many environments, including indoor environments, can undergo dynamic and frequent (or continuous) changes. Any trained propagation model or collected radio map can therefore quickly become out-of-date. Again, extra hardware, such as wireless sensors located in different areas within the environment, can be positioned and used to update the models using the most recent data possible. Alternatively, some systems may predict (instead of physically measuring) signal strengths using detailed pre-knowledge about the environment and specialized ray-tracing simulation software to predict the signal strength in any location in the environment. As such, current systems still require extra hardware or pre-knowledge about the environment. These systems cannot be used in new or unknown environments, and even where pre-knowledge about an area is available, current updates would be required in order to maintain accurate models of the area.

Finally, another drawback of existing wireless positioning systems is the inability of such systems to provide precise accuracy measures or expected error of the calculated positions. Furthermore, current systems are plagued with the problem of data irrelevancy (i.e. the use of insignificant information that can exist in WLAN areas), thereby deteriorating the accuracy of the solution provided and unnecessarily increasing processing time. Accurate positioning is further complicated where the exact location of signal transmitters are not known without pre-knowledge of the area.

There is therefore a need for a more accurate, flexible, and reliable wireless positioning system and method for use in environments having WLAN coverage, but degraded, denied or inaccurate access to reference-based positioning systems. Such a system may not depend on previously determined maps of the area, offline radio scans and surveys, extra network hardware, or simulation software, while still providing accurate positioning and accuracy measures that are not impacted by changes in the environment as well as accuracy measures thereof. Further, such a system may continuously or periodically and automatically adapt to changes in the environments without human efforts or time-consuming offline re-training of the signal-strength-models of the environment.

SUMMARY

A system and method for wireless positioning is provided. More specifically, the present system and method may be used in various environments, including indoor environments, or environments having wireless signal characteristics that are difficult to characterise and model. For example, the present system and method may be used in environments where known reference based positioning systems, such as GNSS, are not effective due to signal unavailability. The present system and method are further capable of determining the locations of "base-stations" and the positioning significance ranking thereof, in the area, the further improve upon the present system and method of wireless positioning.

It is understood that any of the present systems may be used alone or in any combination. It is further understood that any of the present methods may be used alone or in any combination thereof.

A system for predicting the signal strength of a signal transmitted by at least one transceiver means in a wireless network area is provided, the system comprising at least one transceiver means capable of transmitting a power pattern having identifying information about the at least one transmitting transceiver means, and any other transceiver means in the area and visible by the at least one transmitting transceiver means, as well as signal strength information about the at least one transmitting transceiver means, and strength information of received signal transmitted by any other transceiver means in the area and visible by the at least one transmitting transceiver means. The system further comprises at least one processor capable of receiving the power pattern(s) and processing same, using a probabilistic approach, to predict the signal strength of the at least one transmitting transceiver means from any location within the area. More specifically, the present system may build a propagation model of the at least one transmitting transceiver, a power profile of the at least one transmitting transmitter, a radio map of the area, or a combination thereof, to predict the signal strength.

A system for providing wireless positioning in an area having wireless network coverage is further provided, the system comprising at least one transceiver means capable of transmitting a power pattern having identifying information about the at least one transmitting transceiver means and any other transceiver means in the area and visible by the at least one transmitting transceiver means, as well as signal strength information about the at least one transmitting transceiver means, and strength information of received signal transmitted by any other transceiver means in the area and visible by the at least one transmitting transceiver means. The system further comprises at least one processor capable of receiving the power pattern(s) and processing same, using a probabilistic approach, to predict the signal strength of the at least one transmitting transceiver means from any location within the area. More specifically, the present system may build a propagation model of the at least one transmitting transceiver, a power profile of the at least one transmitting transmitter, a radio map of the area, or a combination thereof, to calculate the position. The at least one processor capable of comparing the predicted signal strength with received signal strength to calculate a position. More specifically, the present system may build a propagation model of the at least one transmitting transceiver, a power profile of the at least one transmitting transmitter, a radio map of the area, or a combination thereof, to calculate the position.

A system for providing wireless positioning of a wireless network-enabled device in an area having wireless network coverage is further provided, the system comprising at least one transceiver means capable of transmitting a power pattern and a signal, wherein the power pattern has identifying information about the at least one transmitting transceiver means, and any other transceiver means in the area and visible by the at least one transmitting transceiver means, as well as signal strength information about the at least one transmitting transceiver means and strength information of received signal transmitted by any other transceiver means in the area and visible by the at least one transmitting transceiver means, and the signal comprises identifying information about the at least one transmitting transceiver means. The system further comprises at least one device capable of receiving the signal(s) from the at least one transmitting transceiver means and producing a power fingerprint output indicative thereof having identifying information about the at least one transmitting transceiver means visible by the at least one device, and received signal strength information about the at least one transmitting transceiver means visible by the at least one device. The device is also capable receiving location information from at least one processor. The system further comprises at least one processor capable of receiving the power pattern(s) and processing same, using a probabilistic approach, to predict the signal strength of the at least one transmitting transceiver means from any location within the area, and capable of receiving the power fingerprint and comparing same with the predicted signal strength of the at least one transmitting transceiver means to locate the at least one device within the area. More specifically, the present system may build a propagation model of the at least one transmitting transceiver, a power profile of the at least one transmitting transmitter, a radio map of the area, or a combination thereof, to provide the position of the at least one device.

A system for determining the location of at least one transmitting means in a wireless network area is further provided, the system comprising at least one wireless network-enabled device capable of surveying the area by receiving transmitted signals from the at least one transmitting means at different known locations, the signal comprising identification information of the at least one transmitting means, and producing an output indicative having information linking the received signal strength and the known location of the device when the signal is received by the device. The system further comprises at least one processor capable of utilizing the device output to determine the location of the at least one transmitting means.

A system for ranking a plurality of transmitting means in a wireless network area according to the positioning discrimination significance of each transmitter in the plurality of transmitting means is further provided, the system comprising at least one processor capable of obtaining a table of received signal strength information at a plurality of different locations in the area, applying a principle component analysis to the table of received signal strength information, and ranking the plurality of transmitting means according to the positioning discrimination significance of each.

A method for predicting the signal strength of a signal transmitted by at least one transceiver means in a wireless network area is provided, the method comprising obtaining a power pattern from at least one transceiver means in the area comprising identifying information about the at least one transmitting transceiver means, and any other transceiver means in the area and visible by the at least one transmitting transceiver means, as well as signal strength information about the at least one transmitting transceiver means, and strength information of received signal transmitted by any other transceiver means in the area and visible by the at least one transmitting transceiver means. The method further comprises processing the power pattern(s), using a probabilistic approach, to predict the signal strength of the at least one transmitting transceiver means from any location within the area. More specifically, the method comprises building a propagation model of the at least one transmitting transceiver, a power profile of the at least one transmitting transmitter, a radio map of the area, or a combination thereof, to predict the signal strength.

A method for providing wireless positioning in an area having wireless network coverage is further provided, the method comprising obtaining a power pattern transmitted from at least one transceiver means, the power pattern having identifying information about the at least one transmitting transceiver means and any other transceiver means in the area and visible by the at least one transmitting transceiver means, as well as signal strength information about the at least one transmitting transceiver means, and strength information of received signal transmitted by any other transceiver means in the area and visible by the at least one transmitting transceiver means. The method further comprising processing the power pattern(s), using a probabilistic approach, to predict the signal strength of the at least one transmitting transceiver means from any location within the area, and comparing the predicted signal strength with the received signal strength to calculate a position. More specifically, the method may comprise building a propagation model of the at least one transmitting transceiver, a power profile of the at least one transmitting transmitter, a radio map of the area, or a combination thereof, to calculate the position.

A method for wirelessly positioning at least one wireless network-enabled device in an area having wireless network coverage is provided, the method comprising obtaining a power pattern and a signal transmitted by at least one transceiver means in the area, the power pattern having identifying information about the at least one transmitting transceiver means, and any other transceiver means in the area and visible by the at least one transmitting transceiver means, as well as signal strength information about the at least one transmitting transceiver means, and strength information of received signal transmitted by any other transceiver means in the area and visible by the at least one transmitting transceiver means, and the signal comprising identifying information about the at least one transmitting transceiver means. The method further comprising receiving the signal(s) and producing a power fingerprint output indicative thereof having identifying information about the at least one transmitting transceiver, and received signal strength information about the at least one transmitting transceiver means, and receiving location information from at least one processor. The method further comprising receiving the power pattern(s), and processing same, using a probabilistic approach, to predict the signal strength of the at least one transmitting transceiver means from any location within the area, and comparing the power fingerprint with the predicted signal strength to locate the at least one device within the area. More specifically, the method may comprise building a propagation model of the at least one transmitting transceiver, a power profile of the at least one transmitting transmitter, a radio map of the area, or a combination thereof, to provide the position of the at least one device.

A method for determining the location of at least one transmitting means in a wireless network area is further provided, the system comprising surveying the area at different locations and receiving transmitted signals from the at least one transmitting means at those locations, the signal(s) comprising identification information of the at least one transmitting means, producing an output indicative of the received signal(s), the output comprising information linking the received signal strength and those locations, and processing the output to determine the location of the at least one transmitting means.

A method for ranking a plurality of transmitting means in a wireless network area according to the positioning discrimination significance of each transmitter in the plurality of transmitting means is further provided, the method comprising obtaining a table of received signal strength information at a plurality of different locations in the area, applying a principle component analysis to the table of received signal strength information, and ranking the plurality of transceivers means according to the positioning discrimination significance.

DESCRIPTION OF THE DRAWINGS

FIG. 2 shows an exemplary online measurement table obtained from power patterns transmitted by the transceiver means shown in FIG. 1;

FIG. 7 shows an exemplary online measurement table obtained from power patterns transmitted by the transceiver means shown in FIG. 6;

FIG. 12 provides an illustration of a possible radio map for the WLAN area shown in FIG. 6.

DESCRIPTION OF THE EMBODIMENTS

An improved system and method for providing wireless positioning, and an accuracy measure thereof, in a wireless network-enabled area (e.g. an area covered by a wireless network infrastructure), such as an area having WLAN coverage, is provided. For instance, the present system and method are capable of calculating the position and an accuracy measure of the calculated position of a wireless-network-enabled device in the area.

The present system and method further comprise improved means of determining the locations of "base-stations" in the wireless network in unknown area by referencing local or global coordinate systems without using any reference-based absolute positioning system.

The present system and method further comprise improved means of ordering a plurality of "base-stations" in the wireless network according to the highest location discrimination significance of each base-station in the plurality of base-stations. The order can be further used to calculate an estimated position accuracy if this position is calculated using one or more of the said plurality of base-stations.

More specifically, the present system and method are capable of first, processing transmitted wireless signals in the area to dynamically build an online propagation model of at least one transceiver means, online power profiles of at least one transceiver means and/or an online radio map of the targeted area, and second, to utilize the foregoing information to provide more accurate positing of wireless-network-enabled devices within the area and an accuracy measure thereof. The present system and method can be further improved by first locating the at least one transceiver means within the area and/or by second distinguishing and ranking the at least one transceiver means in the area according to the location discrimination significance of the at least one transceiver means.

It is understood that the processes of the present system and method may be run in parallel on a single processor, or run simultaneously on two or more processors. Further, while it is contemplated that the present system may be used in any area, it may be more useful in indoor areas where, for example, reference based positioning system coverage such as from Global Navigation Satellite Systems (GNSS) is degraded or denied.

Figure 1:
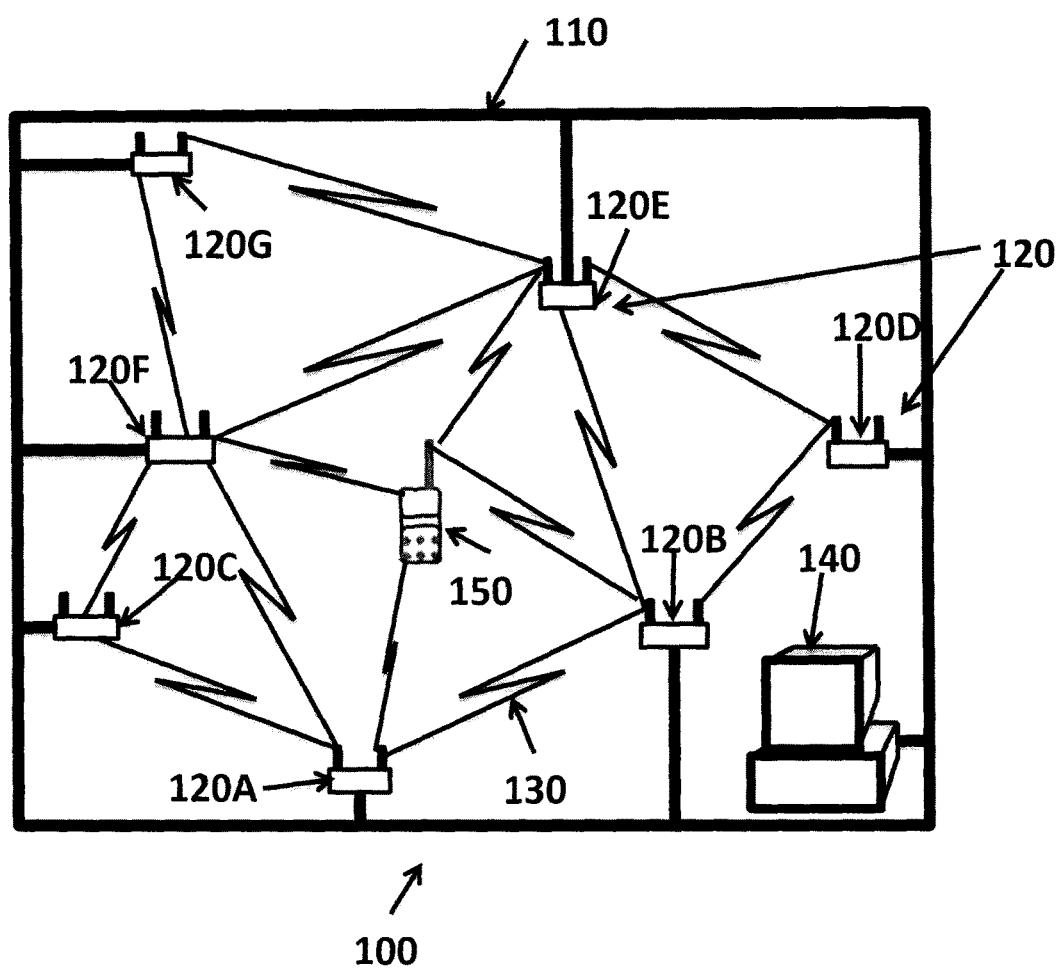
FIG. 1 shows an example of a WLAN area.

Having regard to FIG. 1, an embodiment of the present system 100 comprises a wireless network consisting of at least one "base-station" or transceiver means 120 capable of and/or receiving a wireless signal and capable of acting as a gateway between the wireless network and a wired network 110. In one embodiment, wireless network may be the known IEEE 802.11 wireless local area network (WLAN) known as "Wi-Fi", and the at least one transceiver means may comprise Wi-Fi access points (APs), which may or may not be fixed in one particular location within the targeted area.

The at least one transceiver means may transmit a wireless signal comprising a "power pattern", wherein the power pattern relates to information identifying the at least one transceiver transmitting the power pattern ("transmitting transceiver") and the transmitting signal strength thereof, as well as information identifying any other at least one transceiver means that may be "visible" ("visible transceiver(s)") to the transmitting transceiver and the received signal strengths of the signals transmitted by the visible transceiver (s) as measured by the transmitting transceiver at its particular location. The power pattern may be transmitted via a wired or wireless communication media. It is understood that, the transmitting transceiver can determine its own transmitting power from within its own wireless circuitry taking into account any antennas' gains.

For example, the transceiver 120A may receive wireless signals from other visible transceivers 120B, 120C, and 120F, and can process same along with its own transmitting power to provide a power pattern output having information identifying transceiver 120A and the signal strength of signals transmitted by transceiver 120A, as well as information identifying other visible transceivers 120B, 120C, and 120F and the signal strengths of signals transmitted by visible transceivers 120B, 120C, and 120F, as measured by transceiver 120A at its particular location within the area. In one embodiment, the information identifying the at least one transceiver 120A may be the Media Access Control address (MAC address).

The present system further comprises at least one processing means 140 capable of exchanging information with the at least one transceiver means 120. The at least one processing means 140 may exchange information with the at least one transceiver means 120 through one or more wired or wireless communication channels. For example, having regard to FIG. 1, the at least one processing means 140 may be a computer server. In one embodiment, the at least one transceiver means 120 may send power patterns to the at least one processing means 140 through a wired network 110. In another embodiment, the at least one transceiver means 120 may send power patterns to the at least one processing means 140 wirelessly through at least one transceiver means 120 which, in turn, may route the wirelessly received power patterns to the at least one processing means 140 through the wired network 110. The at least one processing means 140 may utilize the received power patterns to identify the locations of the at least one transceiver means 120 having transmitted a power pattern. For instance, the location information about the at least one transmitting transceiver means 120 may be embedded within the power patterns themselves, or may be obtained and determined by the at least one processing means 140 and indexed by the identification information of the at least one transmitting transceiver means 120.

Where the location information of the at least one transmitting transceiver means 120 is embedded in the power patterns, the at least one processor 140 may obtain the locations by decoding the power patterns. Alternatively, the at least one processor 140 may obtain the information by looking up the information in a table containing the locations of the at least one transceivers indexed by the identification information of the at least one transceiver means 120. The table may be saved on the at least one processing means 140, and can be updated manually or automatically whenever changes occur to the number and/or location of the at least one transceiver means 120 within the area.

Having the locations of the at least one transceiver means 120, the at least one processing means 140 may create an "online measurement table", wherein each row of the table contains the location of the at least one transceiver means 120 and the signal strength of the signals transmitted thereby as received and measured at other at least one transceivers 120 at their particular locations. For example, the at least one processing means 140 may build online measurement table 200, wherein $RSS_B^{(A)}$ means the received signal strength of signals transmitted by transceiver means 120B and received by transceiver means 120A at the current location of transceiver 120A.

Having online measurement table 200, the at least one processing means 140 may build an online propagation model and an online power-profile for each at least one transceiver means 120, and/or an online radio map of the wireless network area. By way of definition, a "propagation-model" is a model that relates the received signal strength of signals transmitted by at least one transceiver means 120 to a distance from that transceiver means 120. A "power-profile" of an at least one transceiver means 120 is a model that predicts the received signal strength of signals transmitted by the at least one transceiver means 120 at any given location in the wireless network area. A "radio map" of the wireless network area is a model that relates the received signal strength of signals transmitted by the least one transceiver means 120 in the wireless network directly to a known location in the area if the said signals received at this known location. A radio map can be obtained by merging power-profiles from a plurality of transceivers in a wireless network area.

Figure 3:
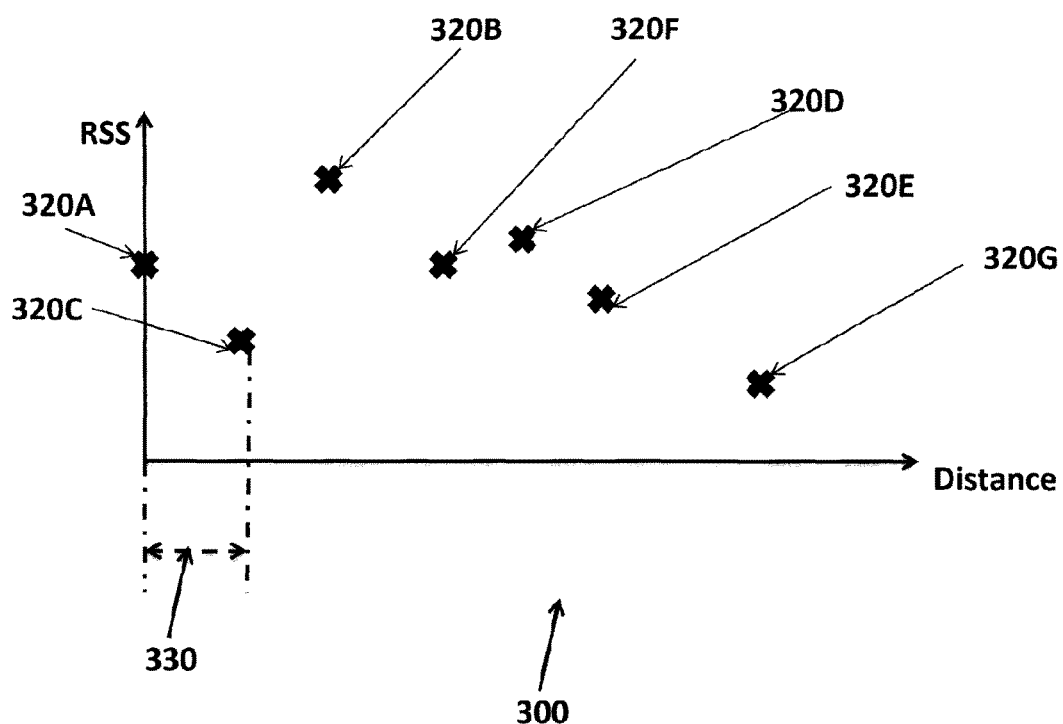
FIG. 3 depicts the signal strength measurements (y-axis) vs. distance (x-axis) from the transceiver means 120A shown in FIG. 1.

For example, having regard to FIG. 2, an improved online propagation-model of at least one transceiver means 120A can be obtained from recent (new) online measurements found in column 210 of table 200. Having regard to FIG. 3, each data point within the column 210 can be plotted such that the vertical value of a data point 320C (or 320B-320G) represents the received signal strength of signals transmitted by transceiver means 120A and received by transceiver means 120C (or 120B-120G) ($RSS_A^{(C)}$) and the horizontal value of data point 320C represents the distance 330 between transceiver means 120A and transceiver means 120C.

As such, the present system attempts to provide improved methods of building online propagation-models and online power-profiles of the at least one transceiver means 120 and/or an online radio map of the wireless network area. In addition, the present system provides an expected accuracy measure with the results of the obtained propagation-models, power-profiles and/or the radio map. The expected error calculated with the obtained propagation-models, power-profiles and/or the radio map can be further used to calculate an expected error of position if that position is calculated using the said propagation-models, power-profiles and/or the radio map.

Further, the present system provides a means of building an online propagation-model for the at least one transceiver means 120 using a probabilistic approach that provides not only a prediction of the received signal strengths transmitted by the at least one transceiver means 120 at any given distance from the transceiver means 120, but also provides an accuracy measure or an expected error of the predicted received signal strength.

Having regard to the propagation model, the present system may build the online propagation-model by obtaining a conditional probability distribution of the signal strength of signals transmitted by transceiver means 120A at any given distance conditioned on the given data points depicted in table 200. By obtaining this conditional probability distribution, the mean of the said conditional probability distribution can be seen as the predicted signal strength and the standard deviation of the said conditional probability distribution can be an indication of the expected error in the said predicted signal strength. For example, where a Gaussian process is assumed to represent the given data points in table 200, the required conditional probability distribution of signal strength transmitted by transceiver means 120A if received at a given distance $x^*$ is a Gaussian probability distribution with mean $\mu_{x^*}$ and variance $\sigma_{x^*}^2$ given by the following formulas:

$$\mu_{x^*}=k(x^*,X)(K+\sigma_n^2 I)^{-1}Y$$

$$\sigma_{x^*}^2=k(x^*,x^*)-k(x^*,X)^T(K+\sigma_n^2 I)^{-1}k(x^*,X)$$

where X is a vector containing the distances obtained from the data points in table 200, Y is a vector containing the corresponding received signal strength, I is the identity matrix with size equal to length of vector X, and K is the covariance matrix over distances values in X using any covariance function such as, for example:

$$Cov(x_i, x_j) = k(x_i, x_j) + \sigma_n^2 \delta(i-j)$$

$$k(x_i, x_j) = \sigma_f^2 \exp\left(-\frac{1}{2}(x_i - x_j)^T M(x_i - x_j)\right)$$

where $x_i, x_j \in X$ and $\delta$ is the Delta Dirac function and $\sigma_n^2$, $\sigma_f^2$, and M are called covariance function parameters. It should be noted that $k(x^*,X)$ is a vector resulting from applying the covariance function between the given distance $x^*$ and all distances in X.

Figure 4:
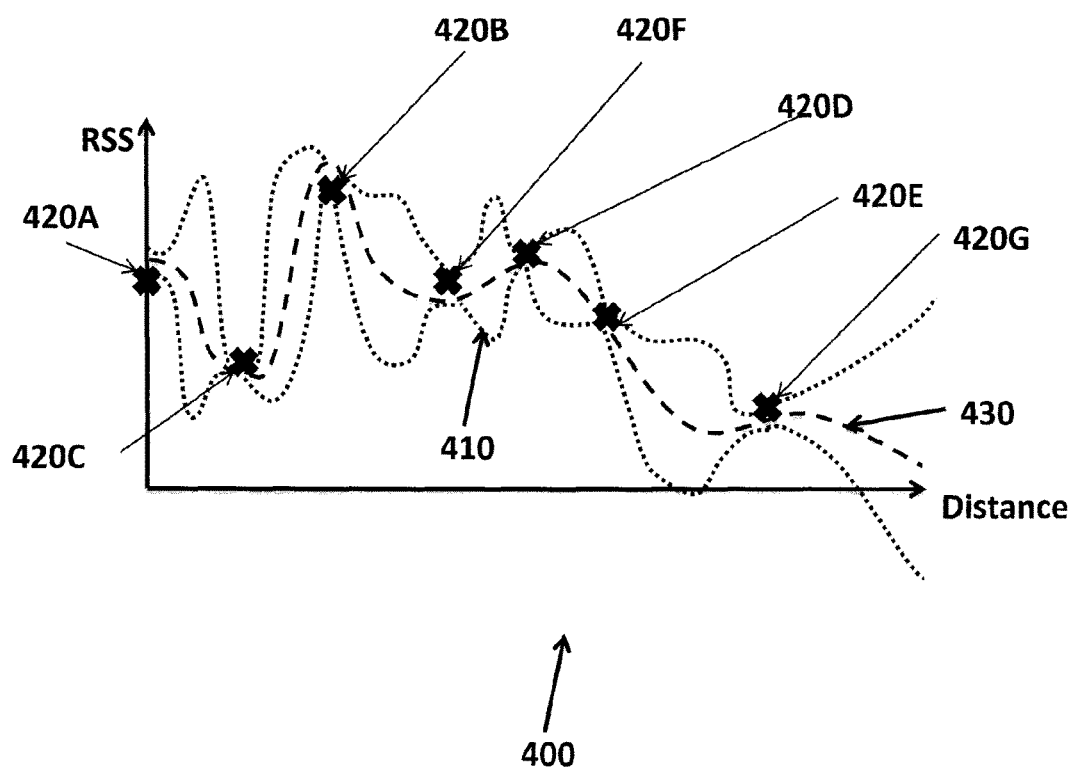
FIG. 4 depicts an exemplary probabilistic propagation model for transceiver means 120A shown in FIG. 1.

An example of the conditional probability of the received signal strength of transceiver means 120A at any given distance given in table 200 is shown in FIG. 4, where the data points obtained from column 210 are referred to as 420A to 420G. It should be understood that data points 420A to 420G exactly correspond to data points 320A to 320G. The mean signal strength prediction 430 (dashed line) and the estimated error "envelope" in the signal strength prediction 410 (dotted lines) are also shown. The estimated error 410 is shown as enveloping the prediction 430, and can appear "shrunken" or reduced in size at the distance values that are close to the distance values already obtained from the online measurement table (which express small expected errors at those distances values). Similarly, the error envelope can appear "expanded" where the distance values that are far away from the given distance values obtained from the online measurement table (which express larger expected errors at those distance values).

The present system is further capable of providing a method of building a propagation-model using a hybrid model that can combine known mathematical formulae and the probabilistic approach. For example, a general mathematical formula can be fit to the data points shown in table 200, and then the error residuals that could not be modeled by the mathematical formula can be estimated using the probabilistic approach. It is understood that any relevant general mathematical formulae may be used, including, without limitation, the common logarithmic decay formula given by:

$$RSS(d)=RSS_o-10n \log_{10}(d/d_0)$$

where $RSS(d)$ is the predicted received signal strength at given distance d and $RSS_o$ is a reference received signal strength measured at known distance $d_0$ and n is a path-loss exponent. Referring to transceiver means 120A, $d_0$ can be set to the nearest other transceiver means 120 to transceiver 120A, which, in this case, is transceiver 120C and, hence, $RSS_o$ will be set to $RSS_A^{(C)}$ obtained from the table 200.

Figure 5:
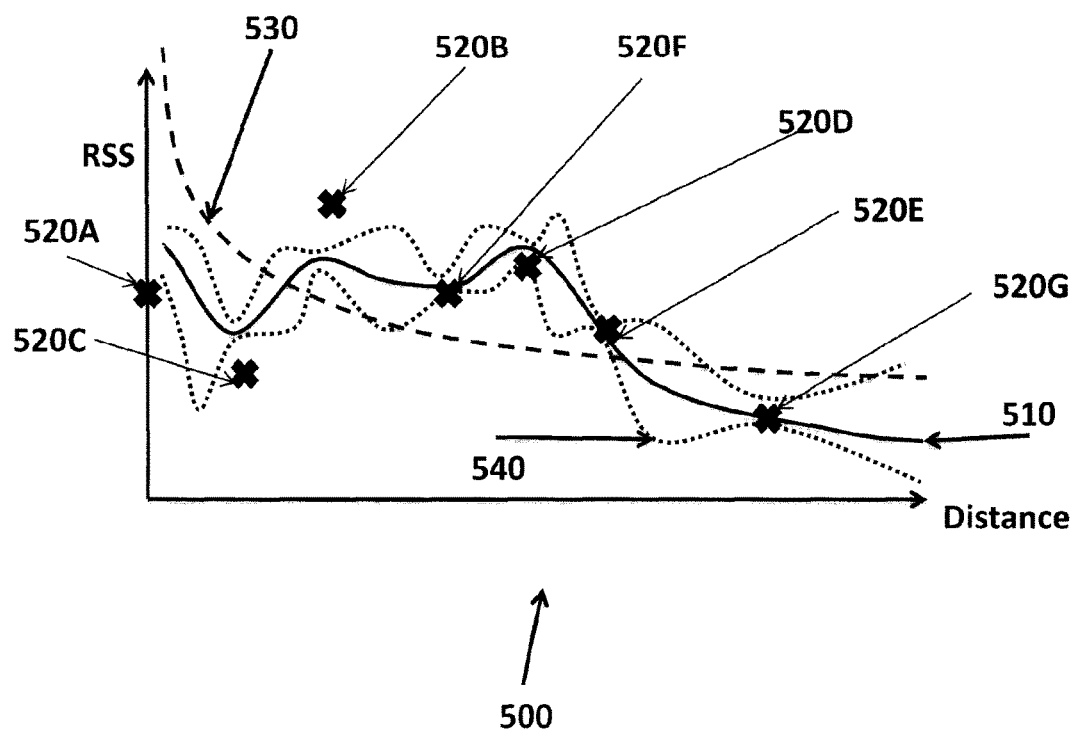
FIG. 5 depicts an exemplary hybrid propagation model for transceiver means 120A.

For example, and having regard to FIG. 5, the mathematical formulae best fitted to data points 520A to 520G for transceiver means 120A obtained from column 210 can be depicted as dashed line 530. Residual errors between the prediction performed by the fitted mathematical formulae and the actual values of data points 520A to 520G can also be depicted. For example, these residual errors can be predicted by a Gaussian-based prediction as follows:

$$RSS\_error(x^*)=k(x^*,X)(K+\sigma_n^2 I)^{-1}(Y-RSS(X))$$

where $RSS\_error_{x^*}$ is the predicted received signal strength error at distance $x^*$ and the required conditional probability distribution of the signal strength transmitted by transceiver means 120A, if the transmitted signal was received at given distance $x^*$, is a Gaussian probability distribution with mean $\mu_x^*$ and variance $\sigma_{x^*}^2$ given by the following formulas:

$$\mu_{x^*}=RSS(x^*)+RSS\_error(x^*)$$

$$\sigma_{x^*}^2=k(x^*,x^*)-k(x^*,X)^T(K+\sigma_n^2 I)^{-1}k(x^*,X)$$

where X is a vector containing the distances obtained from column 210, Y is a vector containing the corresponding received signal strength, I is the identity matrix with size equal to length of vector X, and K is the covariance matrix over distances values in X using any covariance function such as for example:

$$Cov(x_i, x_j) = k(x_i, x_j) + \sigma_n^2 \delta(i-j)$$

$$k(x_i, x_j) = \sigma_f^2 \exp\left(-\frac{1}{2}(x_i - x_j)^T M(x_i - x_j)\right)$$

where $x_i, x_j \in X$ and $\delta$ is the Delta Dirac function and $\sigma_n^2$, $\sigma_f^2$, and M are called covariance function parameters. It should be noted that $k(x^*,X)$ is a vector resulting from applying the covariance function between the given distance $x^*$ and all distances in X.

An example of the hybrid mathematical formulae and probabilistic modeling of the received signal strength of transceiver means 120A at any given distance is shown as data points 520A to 520G, which correspond to data points 320A to 320G. The solid curve 510 shows the hybrid modeled mean signal strength prediction, and the error envelope 540 (the estimated error in the signal strength prediction) can also be depicted, and appears to "shrink" in size at the distance values that are close to distances already given in data points 520A to 520G obtained from column 210 of online measurements table 200 (which express small expected errors at those distances values). Similarly, the error envelope 540 appears to "expand" where the distance values are far away from the given distances in data points 520A to 520G obtained from column 210 of the online measurements table 200 (which express larger expected errors at those distances values).

The expected error in the predicted received signal strength calculated by the present system and method can be used to calculate an expected distance error and an expected position error when the present propagation-models are to be used for providing positioning. For example, a change in distance ΔD corresponding to a change in signal strength ΔRSS can be obtained using the differentiation of a best fitted log-distance mathematical formula as follows:

$$RSS(d) = RSS_o - 10n\log_{10}(d/d_0)$$

$$\frac{\Delta RSS}{\Delta D} = \frac{\partial\left(RSS_o - 10n\log_{10}\left(\frac{d}{d_o}\right)\right)}{\partial d} = \frac{-n}{d\ln(10)}$$

Then, ΔD can be calculated as follows:

$$\Delta D = \left\|\Delta RSS \cdot \frac{d \cdot \ln(10)}{n}\right\|$$

Where RSS(d) is the predicted received signal strength at given distance d and $RSS_o$ is a reference received signal strength measured at known distance $d_0$ and n is a path-loss exponent. The values of $RSS_o$ and $d_0$ can be obtained from the online measurements table.

Figure 6:
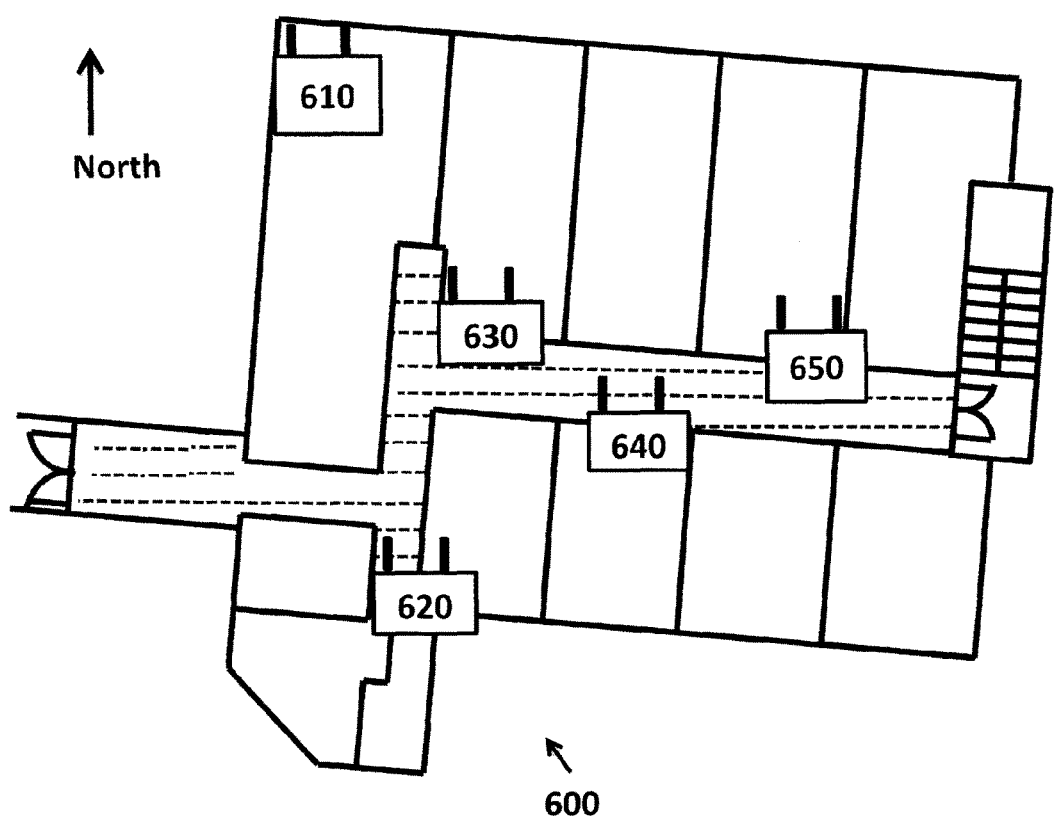
FIG. 6 shows an example of a WLAN area projected on a floor map.

Having regard to the power profile, the present system provides an improved means of building online power-profiles for each at least one transceiver means 120. For example, FIG. 6 shows a floor map of an exemplary indoor area 600 having a wireless network including five transceiver means 610 to 650. Each of the transceiver means 610 to 650 is capable of transmitting information or "power pattern" from which a corresponding online measurement table 700 can be obtained. A "snapshot" of online measurement table 700 is shown in FIG. 7 where $RSS_{650}^{(610)}$ refers to the received signal strength of transceiver means 650 received at transceiver means 610 at its current location.

Figure 8:
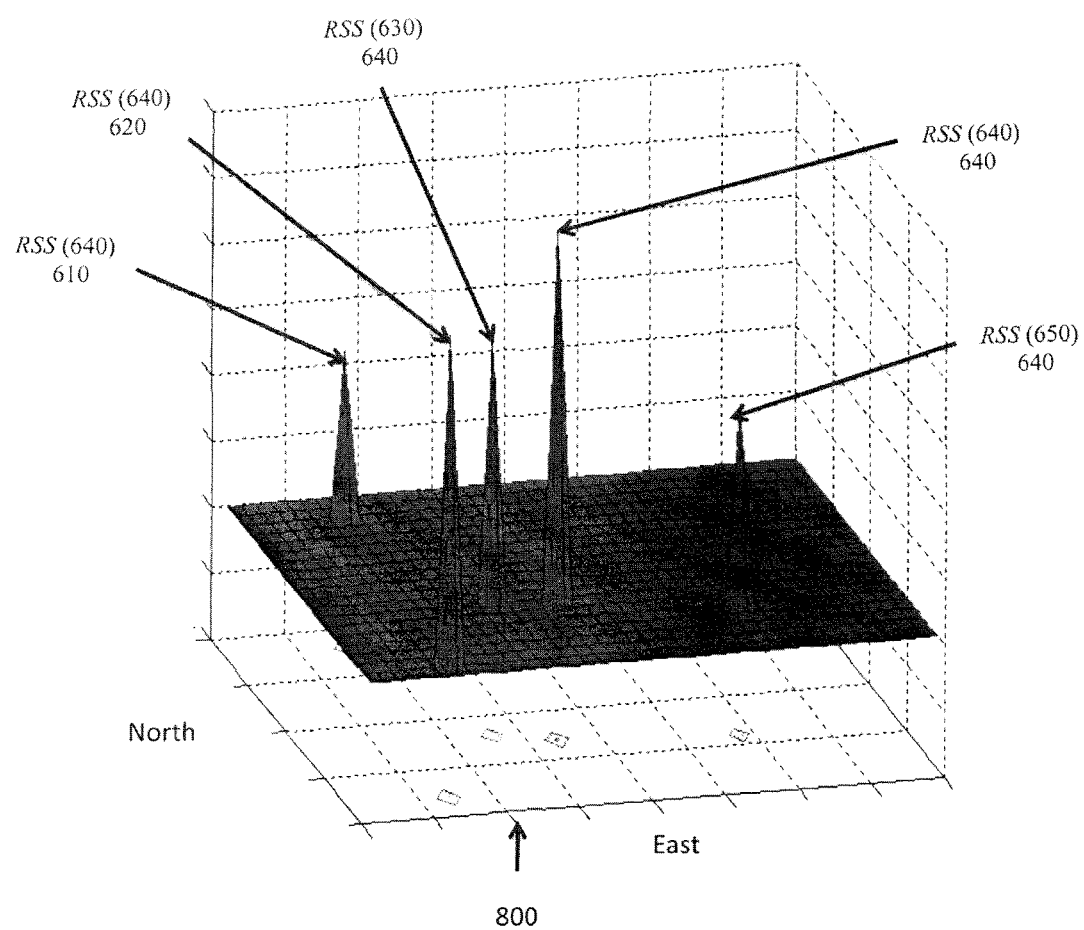
FIG. 8 represents an exemplary two dimensional plot of the signal strength (z-axis) vs. the position (x-axis, y-axis) for the transceiver means 640 shown in FIG. 6.

In order to obtain a "power profile" for transceiver means 640, data points for transceiver means 640 obtained from column 710 of online measurement table 700 can, for example, be used as an initial "compact" or incomplete power-profile for transceiver means 640. In one embodiment, a position can be referenced to by a Cartesian 2D coordinate system. In a 2D Cartesian coordinate system, the received signal strengths values of signals transmitted by transceiver means 640 and received by transceivers 610, 620, 630 and 650 at their locations shown in FIG. 6 can be obtained from column 710 of the online measurement table 700 and plotted as shown in FIG. 8. As such, the graph shown in FIG. 8 can be considered a compact, incomplete power-profile for transceiver means 640.

In order to obtain a full-coverage power-profile for transceiver means 640 from data points for transceiver means 640 obtained from column 710 of online measurement table 700, a probabilistic prediction method is provided that can provide a probability distribution of the received signal strength of the signal transmitted by transceiver means 640 and received at any given location within the area 600.

By way of example, improved methods to obtain such a probability distribution are provided. One method is a probabilistic approach. If a Gaussian process is assumed to represent the given received signal strength values in FIG. 8, the required conditional probability distribution of signal strength transmitted by transceiver 640 if received at a given position x* is a Gaussian probability distribution with mean $\mu_{x^*}$ and variance $\sigma_{x^*}^2$ given by the following formulas:

$$\mu_{x^*} = k(x^*, X)(K + \sigma_n^2 I)^{-1} Y$$

$$\sigma_{x^*}^2 = k(x^*, x^*) - k(x^*, X)^T (K + \sigma_n^2 I)^{-1} k(x^*, X)$$

where X is a vector containing the positions obtained from the data points in FIG. 8, Y is a vector containing the corresponding received signal strength, I is the identity matrix with size equal to length of vector X, and K is the covariance matrix over positions values in X using any covariance function such as for example:

$$Cov(x_i, x_j) = k(x_i, x_j) + \sigma_n^2 \delta(i - j)$$

$$k(x_i, x_j) = \sigma_f^2 \exp\left(-\frac{1}{2}(x_i - x_j)^T M (x_i - x_j)\right)$$

where $x_i, x_j \in X$ and δ is the Delta Dirac function and $\sigma_n^2$, $\sigma_f^2$, and M are called covariance function parameters. It should be noted that k(x*,X) is a vector resulting from applying the covariance function between the given position x* and all positions in X.

The present system and method further comprises a method of obtaining the online power-profile using a hybrid model combining known mathematical formulae and the probabilistic approach. For example, having regard to FIG. 8, a general mathematical formula can be "fit" to the data points relating to transceiver means 640, and then the error residuals that could not be modeled by the mathematical formula can be estimated by a probabilistic approach. General mathematical formulae that can be used in such a method can be the common logarithmic decay formula given by:

$$RSS(d) = RSS_o - 10n \log_{10}(d/d_0)$$

where RSS(d) is the predicted received signal strength at given distance d and $RSS_o$ is a reference received signal strength measured at known distance $d_0$ and n is a path-loss exponent. Referring to transceiver means 640, $d_0$ can be set to the nearest other visible transceiver means, (e.g. transceiver means 630 as shown in FIG. 6) and, hence, $RSS_o$ will be set to $RSS_{640}^{(630)}$ obtained from the online measurement table 700. With reference to FIG. 8, having the mathematical formulae best fitted to data points) ($RSS_{640}^{(610)}$ to $RSS_{640}^{(650)}$) obtained from column 710 in online measurement table 700, the residual errors between the prediction performed by the fitted mathematical formulae and the actual values of data points ($RSS_{640}^{(610)}$ to $RSS_{640}^{(650)}$) can be predicted by a Gaussian-based prediction as follows:

$$RSS\_error(x^*) = k(x^*,X)(K+\sigma_n^2 I)^{-1}(Y-RSS(X))$$

where $RSS\_error_{x^*}$ is the predicted received signal strength error at position x*, and the required conditional probability distribution of the signal strength transmitted by transceiver means 640, if the transmitted signal was received at given position x*, is a Gaussian probability distribution with mean $\mu_{x^*}$ and variance $\sigma_{x^*}^2$ given by the following formulas:

$$\mu_{x^*} = RSS(x^*) + RSS\_error(x^*)$$

$$\sigma_{x^*}^2 = k(x^*,x^*) - k(x^*,X)^T(K+\sigma_n^2 I)^{-1}k(x^*,X)$$

where X is a vector containing the positions obtained from column 710 in table 700 for transceiver means 640, Y is a vector containing the corresponding received signal strength, I is the identity matrix with size equal to length of vector X and K is the covariance matrix over positions values in X using any covariance function such as, for example:

$$Cov(x_i, x_j) = k(x_i, x_j) + \sigma_n^2 \delta(i-j)$$

$$k(x_i, x_j) = \sigma_f^2 \exp\left(-\frac{1}{2}(x_i - x_j)^T M(x_i - x_j)\right)$$

where $x_i, x_j \in X$ and $\delta$ is the Delta Dirac function and $\sigma_n^2$, $\sigma_f^2$, and M are called covariance function parameters. It should be understood that k(x*,X) is a vector resulting from applying the covariance function between the given position x* and all positions in X.

Figure 9:
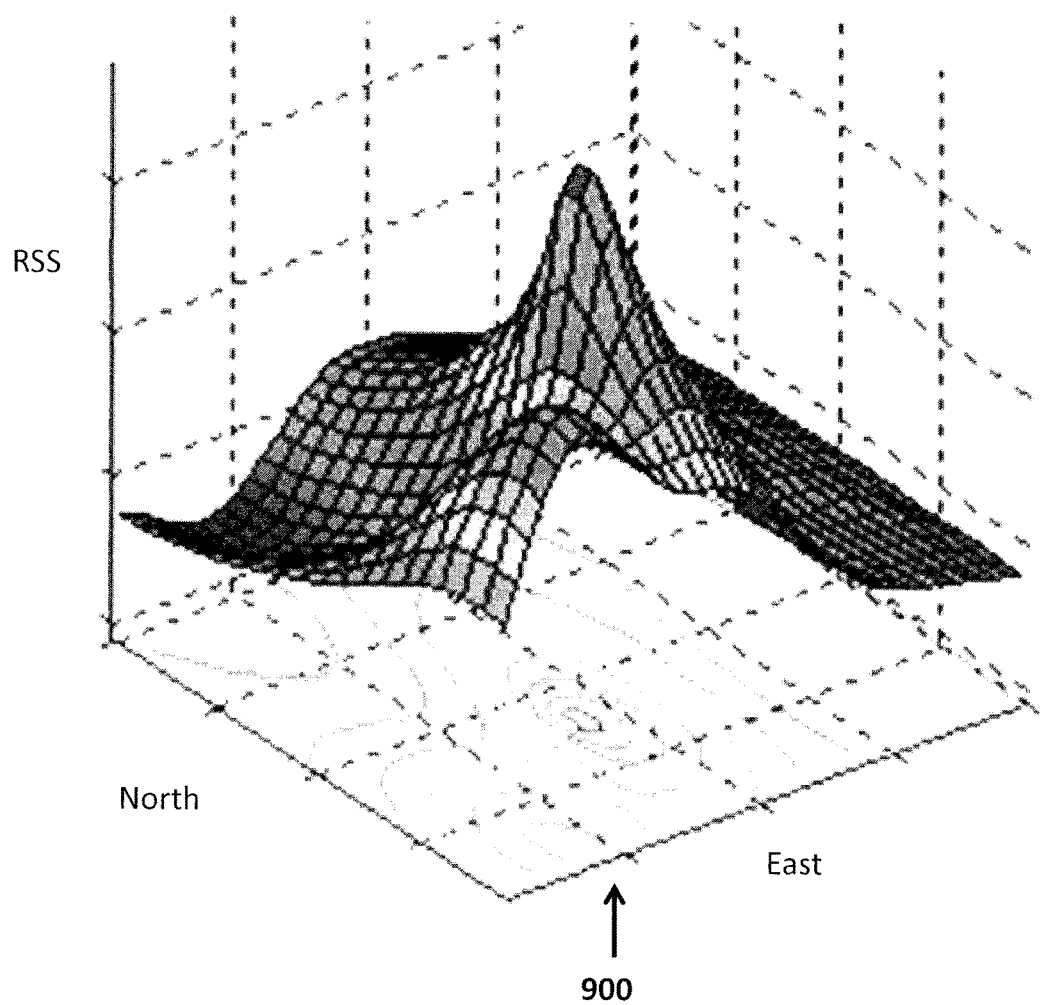
FIG. 9 represents an exemplary power profile of the transceiver means 640 shown in FIG. 6.
Figure 10:
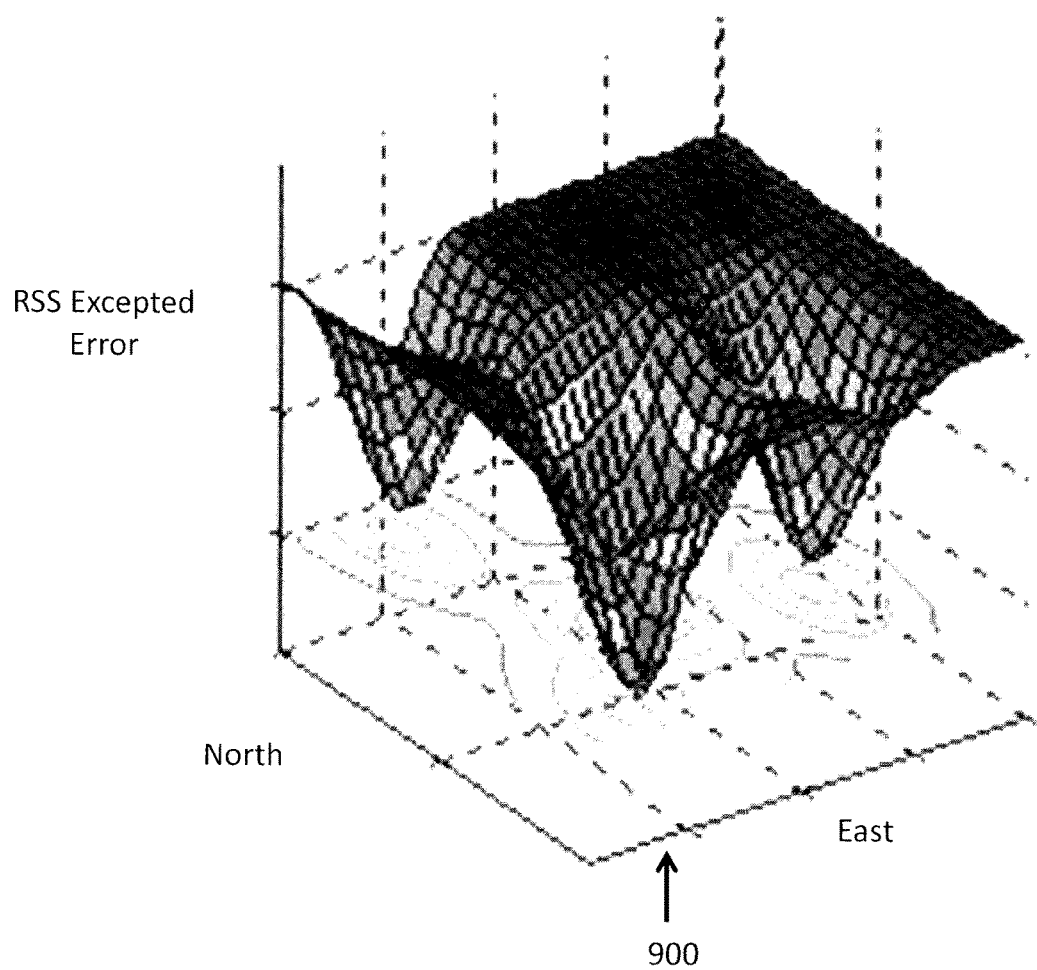
FIG. 10 represents an exemplary power profile expected error for the transceiver means 640 shown in FIG. 6.

An exemplary power-profile relating to transceiver means 640 covering area 600 is depicted in FIG. 9, and the expected error in the received signal strength predicted by that power-profile is shown in FIG. 10. For instance, FIG. 10 can show that the expected error may be small when the positions are close in proximity to the positions used for the prediction (i.e. actual measurements obtained from column 710 in table 700 for transceiver 640). FIG. 10 can also show that the expected error may be larger when the positions are far away from the positions used for the prediction (i.e. actual measurements obtained from column 710 in table 700 for transceiver 640).

Having regard to the radio map, the present system is capable of obtaining an online radio map of the wireless network area. In addition to the improved methods provided earlier of building an online power-profile for each transceiver means in the wireless network using online measurements similar to those in online measurement table 200, an online radio map can be obtained by merging all power-profiles together such that a prediction of the received signal strength of signal transmitted from at least one transceiver means at any given position in the area with any required resolution and an accuracy measure thereof can be obtained. In one embodiment, an accuracy measure can be calculated by averaging the expected error calculated in the power profiles at any given location, thereby obtaining an overall expected error of the predicted received signal strength of signals transmitted from the at least one transceiver means in the area at the particular location.

It should be understood that the ability of predicting signal strength of at least one transceiver means at any location in a wireless network area may itself be useful, for example, in order to the determine best location in the area to setup a receiver such that the receiver may receive the optimal combination of signals from a plurality of transceivers means in the wireless network area.

The present system and method capable of further improving the present propagation-models, power-profiles, and/or radio maps by partitioning the obtained power patterns from the at least one transceiver means into two sets and taking one set as a "testing set", and using same to correct the propagation-models, power-profiles, and/or radio maps. For example, power patterns sent from transceivers 120D and 120G can be used to verify the propagation-models and/or power-profiles of the other transceivers means 120A, 120B, 120C, 120E, 120F. Since the power pattern transmitted by 120D includes actual signal strength, the predicted signal strength of transceiver 120A at the location of transceiver 120D can be compared with the true actual signal strength of transceiver 120A at location of transceiver 120D, which is included in the power patterns transmitted by transceiver 120D and the propagation-model can be corrected accordingly by changing the parameters used to build the model until an accepted error is obtained.

It is understood that the wirelessly transmitted signals may be pre-processed to reduce or cancel any noise and/or to smooth signal strength measurements, as necessary. The signal strength noise cancelation step can be performed using any de-noising algorithm such as, for example, Gaussian Process Smoothing or digital filtering.

The present system and method are further capable of accurately positioning a wireless network-enabled device 150 (e.g. a device capable of communicating with the wireless network infrastructure) within the area using the present improved propagation-models, power-profiles, and/or radio maps. The device 150 may be any wireless network-enabled device such as, for example, a mobile phone, laptop, netbook, and tablet, and may be moving or stationary within the area. In order to calculate a position of the device 150, the device 150 can perform a wireless scan of the area and receive signals from any visible transceiver means 120 containing identification information of the visible transceiver means 120, and process the received signals to construct a "power-fingerprint" comprising the identification information of the visible transceiver means and the received signal strength thereof.

The present system is capable of utilizing the present online propagation-models (for example, as obtained for transceivers 120A, 120B, 120E, and 120F) and the power fingerprint of the device 150 to calculate a position and expected error of the calculated position. For example, the received signal strength of signals transmitted by transceiver 120A and received by the device 150 can be compared to the predicted signal strength of signals transmitted by transceiver 120A found in the propagation-model of 120A, thereby providing for a distance between device 150 and transceiver 120A to be obtained. Furthermore, the expected error in predicted signal strength at this obtained distance can be converted to an expected error in distance. For example, an error in distance ΔD corresponding to an error in signal strength ΔRSS can be obtained using the differentiation of a best fitted log-distance mathematical formula as follows:

$$RSS(d) = RSS_o - 10n\log_{10}(d/d_0)$$

$$\frac{\Delta RSS}{\Delta D} = \frac{\partial\left(RSS_o - 10n\log_{10}\left(\frac{d}{d_o}\right)\right)}{\partial d} = \frac{-n}{d\ln(10)}$$

Then, ΔD can be calculated as follows:

$$\Delta D = \left\| \Delta RSS \cdot \frac{d \cdot \ln(10)}{n} \right\|$$

Where RSS(d) is the predicted received signal strength at given distance d and $RSS_o$ is a reference received signal strength measured at known distance $d_0$ and n is a path-loss exponent. The values of $RSS_o$ and $d_0$ can be obtained from the online measurements table.

Similarly, using the online propagation models built from other visible transceiver means 120 propagation-models, distances between the device 150 and, for example, transceivers 120B, 120E, and 120F and expected error of those distances can be obtained. Once the locations of transceivers 120A, 120B, 120E, and 120F are known, the distances between the device 150 and those visible transceivers 120A, 120B, 120E, and 120F and the expected error in those distances, a trilateration algorithm can be applied to calculate the position of the device 150 and the expected error in the calculated position.

Similarly, the present online radio maps and the power fingerprint obtained by the device 150 can also be used to calculate a position of the device 150 and the expected error of the calculated position. For example, the received signal strength of signals transmitted by transceivers 120A, 120B, 120E, and 120F, and received by the device 150 can be compared to the predicted signal strength of transceivers 120A, 120B, 120E, and 120F in the predicted radio map of the area, and the position corresponding to the nearest signal strength "match" in the radio map will determine the position of the device 150. Furthermore, the expected error in predicted signal strengths at the device's position in the radio map can be converted to an expected position error by, for example, multiplying the expected error in predicted signal strength by a factor to be converted to and expected error of position.

Figure 11:
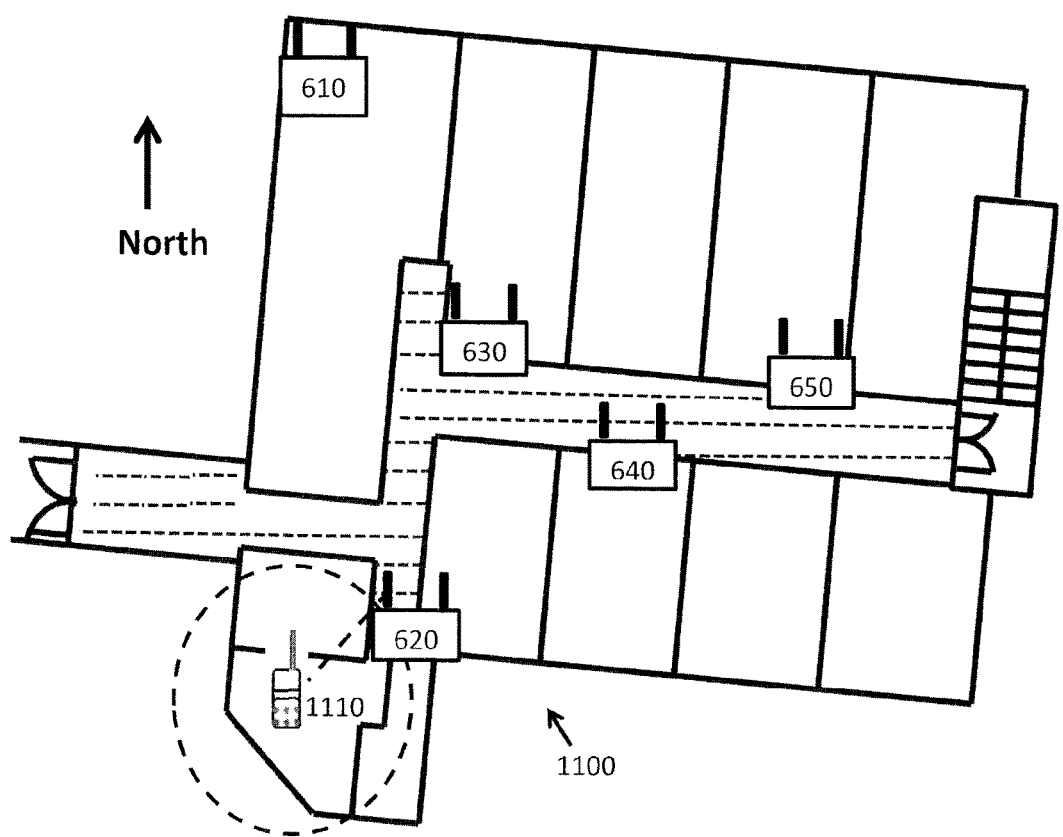
FIG. 11 depicts a scenario where only a single transceiver means is visible by a wireless-network-enabled device.

It should be understood that where only one single transceiver means 120 is visible by the device 150, the power profile of the single visible transceiver means 120 can still be used to provide a position and expected error of this position of the device 150. For example, having regard to FIG. 11, the device 1100 has only one "visible" transceiver means 620. By comparing the received signal strength of the signal transmitted by transceiver means 620 as received by device 1100 to the predicted signal strengths in the power-profile of 620, a plurality of possible positions as well as expected errors thereof can be obtained for the device 1100.

The at least one processing means 140 may provide the position of the device 1100 (comprising the positioning information and the error standard deviation), whereby the device 1100 may be capable of displaying its position on, for example, a screen with a floor map of the area.

It is understood that the online radio map prediction process may be performed by the at least one primary processing means building the map, or alternatively, by any multiple local at least one processing means, whereby each at least one processing means may predict and build a partial radio map. The partial radio maps can then be sent to the at least one primary processing means, which can then merge the partial radio maps into a single radio map covering the entire target area.

Further, the online radio map prediction process may be implemented on the device 150 itself, thereby providing a local radio map of the area surrounding the device's location. The local radio map can then be used by one or more of the at least one processing means 140 to position the device 150 within the area, and to build an enhanced radio map covering the entire area but having enriched, expanded, enhanced, verified or corrected information about the local area.

As such, the device 150 may calculate its own position after receiving (or downloading) the appropriate local radio map from one or more of the at least one processing means, or after dynamically building an online local radio map utilizing the power patterns transmitted from visible transmitting transceiver(s) 120 visible at the location of the device 150. It is understood that the at least one processing means 140 provided to predict and build the radio map, propagation model or pattern profiles and that provided to position the device within the area may be the same at least one processor, or any combination thereof.

It is understood that the at least one processing means may utilize the propagation models, the power profiles, and/or the radio map alone or in combination with each other, to more accurately position the device. As such, the present system and method are capable of improving the positioning of a wireless-network-enabled device within an area, by providing a wireless-network-enabled device capable of building a power fingerprint and transmitting an output indicative thereof to the at least one processor means, whereby the processor means may compare the power fingerprint output to estimated online power patterns.

One embodiment of the present system and method is exemplified by the following steps:

1) Online Data Acquisition:
   The at least one transmitting transceiver(s) periodically transmit or send a power pattern to the at least one processing means;
2) Noise Filtering:
   The at least one processing means may perform a filtering technique, such as a low pass filtering, on the received power patterns. Such filtering may be performed to reduce the noise associated with signal power measurements;
3) Power Profile Prediction:
   Where there are N at least one transmitting transceiver(s), an N×N power pattern online measurement table may be constructed wherein each column in the data table may represent at least one transmitting transceiver(s) in the targeted area, and each row may represent a location defined by any coordinate system such as, for example, Cartesian coordinates or coordinates from a geographic coordinate system. Each row may also contain N power measurements in different locations in the targeted area (see FIG. 2);
   The power profile of an at least one transmitting transceiver(s) relates to the power measurement of the at least one transmitting transceiver(s) in all locations in the targeted area, and may be estimated probabilistically based on the N power measurements in the N×N power patterns in the online measurement table. The power estimation in unknown locations can be performed using a Gaussian-based regression algorithm. Initially, a covariance N×N matrix is calculated over the N positions available in the online measurement table. Covariance matrix elements are calculated by a kernel function as follows:

$$\operatorname{Cov}(y_i, y_j) = k(x_i, x_j) + \sigma_n^2 \delta(i-j)$$

where $$k(x_i, x_j) = \sigma_f^2 \exp\left(-\frac{1}{2}(x_i - x_j)^T M(x_i - x_j)\right)$$

where i,j represent row i and column j of the covariance matrix, $x_i$ and $x_j$ represent the locations recorded in row i,j in the online measurement table for current transceiver means and $y_i$, $y_j$ are the signal strength measurements recorded in row i,j in the online measurement table for current transceiver means. Parameters $\sigma_n^2$, $\sigma_f^2$, and M are called covariance function parameters and they can be optimized to perform the best positioning accuracy.

Having the covariance matrix K for all positions in the online measurement table, signal power in unknown location x* can be estimated according to:

$$\mu_{x^*} = k(x^*, X)(K + \sigma_n^2 I)^{-1} Y$$

$$\sigma_{x^*}^2 = k(x^*, x^*) - k(x^*, X)^T (K + \sigma_n^2 I)^{-1} k(x^*, X)$$

where $\mu_{x^*}$ is the predicted power estimation at this unknown location and $\sigma_{x^*}^2$ is the error standard deviation of that prediction. The estimated power profile and corresponding standard deviation for an at least one transmitting transceiver(s) in a 2D area is exemplified in FIGS. 9 and 10;

4) Online radio map prediction:
The at least one processing means may construct an online radio map by merging the predicted power profiles obtained in step 3 above such that, for each location x there is a corresponding vector of signal strength from all transmitting transceiver(s) in the targeted area visible from this location.

5) Radio map Online Dynamic Verification and Calibration Process 5.1) Online Verification
During the power profile estimation and radio map construction steps, a portion of the power patterns received (such as, for example, a ~20%) can be partitioned out as "testing power patterns" and used for a verification process, whereby the accuracy of the predicted online radio map may be tested. The verification procedure comprising entering the testing power patterns to the positioning procedure to estimate a location for each transmitting transceiver(s)'s power patterns in testing power patterns. The resulting locations can then be compared to the reference locations obtained from the transceiver(s)'s power patterns and the square error can be recorded;

5.2) Online radio map Correction
Where the squared error is larger than a desired threshold value, the parameters used in constructing the radio map can be changed according to any optimization algorithm, and the transceiver(s)'s power profile estimation process can then be repeated over the testing power patterns based upon the changed parameters. A new radio map can subsequently be constructed by merging the resulting verified power profiles. The verified radio map can then be used again with the testing power patterns to verify its accuracy. This process may continue until an acceptable square error is obtained.

6) Positioning Procedure
A wireless-network-enabled device within the area and capable of scanning the area, performs a wireless scan to collect the device power fingerprint. The power fingerprint is sent to the at least one processing means, whereby the at least one processing means uses the power fingerprint to determine a position of the device by comparing the power fingerprint of the device with the predicted power patterns in the recent online radio map, and an error standard deviation thereof. The location can be transmitted back to the device via any communication channel.

The present system and method further provide a means of estimating or predicting the locations of at the least one wireless transceivers 120 in the wireless network area, without the need for any absolute positioning system such as for example Global Satellite Navigation Systems (GNSS). This means may be useful where the wireless positioning system is to be used in an unknown wireless network area that would typically require pre-knowledge about the locations of the at least one transmitting means that constitute the wireless infrastructure. The present means may also be useful in circumstances where the wireless network area is an unknown indoor area and the locations of the transmitting means that constitute the wireless infrastructure are not known. It is understood that while the transmitting means are referred to herein as transceiving means, the transmitting means need not necessarily be a transceiver means comprising a receiving means.

In one embodiment, the present system and method are capable of establishing a local coordinate system in the wireless network area such as, for example, a Cartesian coordinate system, and obtaining a radio map of the area by, for example, performing a radio survey at a plurality of known locations with respect to the established local coordinates in the area. This may be performed (at each one of the plurality of known locations) by:

1) Performing a wireless scan of the area to receive signals from any visible at least one transceiver means in the area. This scan may be performed by a scanning or surveying device 150. It is assumed that the signals transmitted from the at least one transceivers in the area include identification information that identifies each at least one transceiver;

2) Decoding the received signals and identifying each of the at least one visible transceiver means;

3) Measuring the received signals at the current known location of the device;

4) Saving the received signal (identification information and signal strength information) and corresponding current location of the device into a radio map database table, wherein each row in the table contains the current location and the identification and received signal strengths of the received signals from at least one transceiver means;

5) Determining a coarse local location of each at least one transceiver means having transmitted signals saved in the said radio map database by:
   a. Searching the database for the maximum received signal strength from the each at least one transceiver means; and
   b. Determining the local location of each at least one transceiver means as the corresponding local location to the maximum received signal strength;

6) Repeating steps 1-5 at a plurality of local locations with higher resolution around the calculated coarse location in order to determine the locations of the at least one transceiver means having the highest resolution calculated in step 3.

The present system and method is further capable of converting the calculated local coordinates of each at least one transceiver means to any other local coordinate system.

For example, if location in the local coordinate system is known with respect to another local coordinate system, a conversion rule can be known and any calculated position of each at least one transceiver means can be converted to the other local coordinate system. For example, the calculated local coordinates of each at least one transceiver can be converted to a global system such as, for example, World Geodetic System: WGS84 coordinate system that is used by Global Navigation Satellite Systems (GNSS). More specifically, if a location in the local coordinate system is known with respect to World Geodetic System: WGS84 coordinate system, a conversion rule can be applied and any calculated position of each wireless transceiver can be converted to World Geodetic System: WGS84 coordinate system.

The present system and method is further capable of ranking or ordering the at least one transmitting means in the wireless network according to the positioning discrimination significance. The obtained ranking can be further used to estimate the positioning accuracy, where the positioning was calculated or estimated using the ranked at least one transmitting means. For example, the ranked transmitting means can be divided into groups such as ("high quality", "medium quality", "low quality") and then based on the quality group that the majority of transmitting means used for calculating a position belong to, an accuracy measure can be determined. In another example, the ranked transmitting means can be seen as weights and the accuracy measure of a position calculated from at least one ranked transmitting means can be a weighted average of individual weights of thereof.

As such, the present system and method may improve the performance of existing wireless positioning systems by using only the most significant at least one transceiver means in the positioning calculations, thereby reducing the effects of signal noises and redundancies resulting from including insignificant transceiver means in the positioning process.

By way of example, the present radio map can be seen as a radio map matrix where each row consists of a known location or position in the area and the corresponding received (either measured or predicted) signal strength of signals transmitted by a plurality of transmitting means. It is understood that while the transmitting means are referred to herein as transceiving means, the transmitting means need not necessarily be a transceiver means comprising a receiving means. FIG. 12 shows an exemplary radio map 1200 (corresponding to the wireless network area 600 and wireless transceivers 610, 620, 630, 640, and 650 shown in FIG. 6) having a collection of N known locations and the corresponding received (either measured or predicted) signal strength of signals transmitted by transceivers 610, 620, 630, 640, and 650, where, for example, $RSS_{620}^{(j)}$ represent the received signal strength from signals transmitted by transceiver 620 and received at location j.

Referring to FIG. 12, a sub-matrix 1210 containing the signal strength values can be determined. A Principle Component Analysis (PCA) method can then be applied to the sub-matrix 1210 in order to obtain a PCA transformation matrix and a PCA-transformed version of sub-matrix 1210 such that the first column in the PCA-transformed version of sub-matrix 1210 has the highest variance. It should be understood that any in PCA transformed matrix, columns are ordered according to variances such that the first column of the PCA transformed matrix is the column with the highest variance, and that each value in the PCA-transformed version of sub-matrix 1210 is a linear combination of the original signal strength values of the original sub-matrix 1210. For example, value (i,j) which is the $i^{th}$ element in the $j^{th}$ column in the PCA-transformed version of the sub-matrix 1210 is obtained by applying dot product between the $i^{th}$ row in the original sub-matrix 1210 and the $j^{th}$ column in the PCA transformation matrix. The columns of the PCA transformation matrix may be obtained by calculating the Eigen vectors of the covariance matrix of the original sub-matrix 1210 and ordering them such that the first column of the PCA transformation matrix is the Eigen vector corresponding to the maximum Eigen value.

Having regard to the obtained PCA transformation matrix, each column of the PCA transformation matrix obtained has a number of elements equal to the number of columns in the original matrix. For example, in sub-matrix 1210, each column in the PCA transformation has five numerical values corresponding to the five transceivers 610, 620, 630, 640, and 650. For each column in the PCA transformation matrix, transceivers can be ranked or ordered according to their corresponding absolute numerical values in that column of the PCA transformation matrix. As such, a PCA transformation matrix for matrix 1210 can consist of five columns, and five different sets of rankings of transceivers 610, 620, 630, 640, and 650 can be obtained. By ordering transceivers 610, 620, 630, 640, and 650 according to their corresponding absolute numerical value in column number 1 (or the first column) in the PCA transformation matrix for matrix 1210, a first ranking (ranking #1) is obtained. Similarly, by ordering transceivers 610, 620, 630, 640, and 650 according to their corresponding absolute numerical values in column number 2 (second column) in PCA transformation matrix for matrix 1210, a second ranking (ranking #2)) is obtained, and so on. According to PCA, the first column corresponds to the largest Eigen value and it is the column used to generate the first column in the PCA transformed matrix which has the highest variance. This means that ranking #1 has higher weight than ranking #2 in matrix 1210. Similarly, ranking #2 has higher weight than ranking #3 and so on. Having the weighted ranking sets obtained for transceivers 610, 620, 630, 640, and 650, provides that any voting algorithm can be applied to have an overall rank or order of each transceiver in the transceivers 610, 620, 630, 640, and 650. For example, a first ranked transceiver means can be selected by choosing the transceiver means corresponding to the maximum absolute numerical value in column #1 in the PCA-transformation matrix, and a second ranked transceiver means can be selected by choosing the transceiver means corresponding to maximum absolute numerical value in column #2 after excluding any previously chosen first ranked transceivers. This process can continue until all transceiver means have been ranked.

It will be appreciated that the scope of the present invention is not limited to the above described embodiments, but rather is defined by the appended claims, and that these claims will encompass modifications of and improvements to what has been described.

What is claimed is:

1. A system that builds a model for predicting the received signal strength at any location within a wireless network area of a signal transmitted by at least one transceiver means, the system comprising:
   a. at least one transceiver means that constitutes the infrastructure of the wireless network configured to transmit a power pattern comprising:
      i. information that identifies the at least one transmitting transceiver means, and information that identifies any other transceiver means in the area and visible by the at least one transmitting transceiver means, ii. power information for a signal transmitted by the at least one transmitting transceiver means, and iii. received signal strength information of signals transmitted by the any other transceiver means in the area and visible by the at least one transmitting transceiver means, and b. at least one processor configured to receive the power pattern transmitted from each of the at least one transceiver means and i. processing the information that identifies the at least one transceiver means to locate the at least one transceiver means, and ii. automatically and dynamically building the model online for predicting received signal strength of a signal transmitted by the at least one transceiver means at any location within the area, wherein the power patterns transmitted by the at least one transceiver means are broadcasted wirelessly or transmitted through a wired network to the at least one processor.

2. The system of claim 1, wherein the at least one processor is programmed to build one of the following models to predict the signal strength of the at least one transceiver means at any location within the wireless network area:

a. an online propagation model of the at least one transceiver means, wherein the propagation model relates the received signal strength from the at least one transceiver means to a distance from the at least one transceiver means, b. an online power profile of the at least one transceiver means, wherein the power profile relates the received signal strength from the at least one transceiver means to a location in the wireless network area, or c. a combination of the propagation model and the online power profile of the at least one transceiver means.

3. The system of claim 2, wherein the online models for predicting the signal strength of the at least one transceiver means are built using an adaptive, calibrated best-fit mathematical formula calibrated dynamically online based on the information in the power patterns.

4. The system of claim 2, wherein the online models for predicting the signal strength of the at least one transceiver means are built using an adaptive, calibrated conditional probabilistic approach where the prediction of the signal strength at any distance from the at least one transceiver means or at any location in the wireless network area is modeled as the probability of the signal strength conditioned on, or given, the signal strength information in the power patterns.

5. The system of claim 2, wherein the online models for predicting the signal strength of the at least one transceiver means are built using the combination of an adaptive, calibrated hybrid approach that combines a best fit mathematical model to dynamically estimate a general pattern of the received signal strength and a conditional probabilistic approach to estimate residual signal strength errors that cannot be modeled using the best fit mathematical model.

6. The system of any one of claims 1 to 5 wherein the online models for predicting the signal strength of the at least one transceiver means undergo online, automatic, dynamic, and adaptive verification and correction to adapt to any change in the wireless network area.

7. The system of claim 6 wherein the verification and the correction of the models occurs periodically.

8. The system of any one of claims 1 to 5, wherein the at least one processor is further programmed to calculate an accuracy measure of the predicted signal strength.

9. The system of claim 8, wherein the at least one processor is further programmed to calculate the accuracy measure of the predicted signal strength by:

a. calculating a conditional probability of the signal strength conditioned on, or given, the information in the power patterns, b. calculating a variance of the conditional probability, and c. converting the variance into an accuracy measure of the predicted received signal strength.

10. The system of any one of the claims 1 to 5 wherein the at least one processor is further programmed to determine a location for each of the at least one transceiver means using:

a. a table containing the location of each of the at least one transceiver means indexed by the information that identifies the at least one transceiver means, or b. by encoding the location of each of the at least one transceiver means in the power patterns transmitted by the at least one transceiver means.

11. The system of any one of claims 1 to 5 wherein the at least one processor is further configured to position at least one wireless-enabled device differently from the at least one transceiver means that constitutes the infrastructure of the wireless network, the system comprising:

a. at least one wireless-enabled device configured to receive the signal from some of the at least one transceiver means and producing a power fingerprint output indicative thereof comprising:

i. information that identifies the at least one transceiver means visible by the at least one wireless-enabled device, and ii. received signal strength information about the at least one transceiver means visible by the at least one wireless-enabled device, wherein the at least one processor compares the signal strength predicted by the online models with the power fingerprint received from the wireless-enabled device to calculate a position of the wireless-enabled device.

12. The system of claim 11 wherein the online models for predicting the signal strength of the at least one transceiver means at any location within the wireless network comprise:

a. an online propagation model of the at least one transceiver means, wherein the propagation model relates the received signal strength from the at least one transceiver means to a distance from the at least one transceiver means, b. an online power profile of the at least one transceiver means wherein the power profile relates the received signal strength from the at least one transceiver means to a location in the wireless network area, or c. a combination of an online propagation model and an online power profile of the at least one transceiver means.

13. The system of claim 11 wherein the at least one wireless-enabled device receives the position calculated by the at least one processor through one of the following options:

a. through a wireless communication between the at least one processor and the at least one wireless-enabled device, b. through a wired communication between the at least one processor and the at least one wireless-enabled device, or c. by embedding the at least one processor inside the at least one wireless-enabled device in a single device.

14. The system of claim 11, wherein the at least one processor is programmed to dynamically calculate a position of the at least one wireless-enabled device by:
   a. using the online models for predicting signal strength of the at least one transceiver means at any location within the wireless network area and the power fingerprint of the at least one wireless-enabled device to estimate a distance between the wireless enabled device and the at least one known location transceiver means, and
   b. performing a trilateration operation to calculate a position of the at least one wireless-enabled device.

15. The system of claim 11, wherein the at least one processor is programmed to dynamically calculate a position of the at least one wireless-enabled device by:
   a. using the online models for predicting the signal strength of the at least one transceiver means at any location within the wireless network area and the power fingerprint of the at least one wireless enabled device,
   b. searching for the location at which the predicted signal strength is best-matched with the signal strength in the power fingerprint of the at least one wireless-enabled device, and
   c. providing this best-matched location as the calculated position of the wireless-enabled device.

16. The system of claim 11, wherein the at least one processor is programmed to dynamically calculate a position of the at least one wireless-enabled device by using a hybrid positioning technique which combines a trilateration method and a best-matched signal strength method; wherein the trilateration method comprises:
   a. using the online models for predicting signal strength of the at least one transceiver means at any location within the wireless network area and the power fingerprint of the at least one wireless-enabled device to estimate a distance between the wireless enabled device and the at least one known location transceiver means; and
   b. performing a trilateration operation to calculate a position of the at least one wireless-enabled device:
   and wherein the best-matched signal strength method comprises:
   a. using the online models for predicting the signal strength of the at least one transceiver means at any location within the wireless network area and the power fingerprint of the at least one wireless enabled device;
   b. searching for the location at which the predicted signal strength is best-matched with the signal strength in the power fingerprint of the at least one wireless-enabled device; and
   c. providing this best-matched location as the calculated position of the wireless-enabled device.

17. The system of claim 11, wherein the at least one processor is further programmed to calculate an accuracy measure of the calculated position of the at least one wireless-enabled device.

18. The system of claim 17, wherein the at least one processor is programmed to calculate an accuracy measure of the calculated position of the wireless-enabled device by:
   a. calculating a conditional probability variance of the predicted signal strength that matches the received signal strength contained in the power fingerprint of the at least one wireless-enabled device,
   b. converting the variance into a distance accuracy measure using a mathematical formula,
   c. forming a covariance matrix of the estimated distances between the at least one wireless-enabled device and the at least one transceiver means, wherein the covariance matrix is a diagonal matrix having diagonal elements containing the calculated distance accuracy measures, and
   d. calculating an accuracy measure of the positioning using the trilateration method.

19. The system of claim 17, wherein the at least one processor is programmed to calculate an accuracy measure of the calculated position of the wireless-enabled device by:
   a. calculating a conditional probability variance of the predicted signal strength that matches the received signal strength contained in the power fingerprint,
   b. converting the variance into a location accuracy measure,
   c. searching for the location at which the predicted signal strength is best-matched with the signal strength in the power fingerprint of the at least one wireless-enabled device, and
   d. calculating an accuracy measure of the calculated positioning using the calculated accuracy measure of the locations at which the predicted signal strength is best-matched with the signal strength in the power fingerprint of the at least one wireless-enabled device.

20. The system of claim 17, wherein the at least one processor is programmed to calculate an accuracy measure of the calculated position of the wireless-enabled device by ranking the at least one transceiver means according to its positioning discrimination significance by:
   a. obtaining a power profile of the at least one transceiver means,
   b. merging all power profiles of all of the at least one transceiver means to construct a radio-map of the area,
   c. applying a principle component analysis to the constructed radio map,
   d. ranking the at least one transceiver means according to the positioning discrimination significance of each, and
   e. using this calculated ranking to calculate an accuracy measure of the calculated position of the wireless-enabled device calculated using the received signals strength from the at least one transceiver means.

21. The system of any one of the claims 1 to 5 wherein the at least one processor is further programmed to calculate the location of each of the at least one transceiver means.

22. The system of claim 21, wherein the at least one processor is further programmed to calculate the location information about the at least one transceiver means in the wireless network area which is needed to start the online dynamic automatic prediction of signal strength of the at least one transceiver means, the system comprising:
   a. at least one wireless network-enabled device capable of:
      i. surveying the area by receiving transmitted signals from the at least one transceiver means at different known locations with respect to any local coordinate system in the wireless network area, the signal comprising identification information of the at least one transceiver means, and
      ii. producing a power profile indicative thereof, the power profile output comprising information linking the received signal strength and the known location of the device when the signal is received by the device, and
   b. at least one processor further configured to utilize the power profile output to determine the location of the at least one transceiver means with respect to the any local coordinate system by:

i. determining the location with respect to any local coordinate system of the at least one transceiver means as the location at which the resolution of the received signal strength of the at least one transceiver means is maximum,
ii. re-surveying the area around the determined location having the maximum resolution,
iii. determining the location of the at least one transceiver means as the location at which the received signal strength of the at least one transceiver means is maximum, and
iv. repeating steps b.i to b.ii until accepted location resolution is obtained.

23. The system of claim 22 wherein the location information about the at least one transceiver means in the wireless network area is calculated with respect to an absolute global coordinate system without having any absolute positioning system by:
   a. considering the calculated local-coordinate locations of the at least one transceiver means as initial local-coordinated locations,
   b. converting the initial local-coordinated locations into an absolute positioning coordinate system using a map having estimated initial map border coordinates with respect to the absolute coordinate system,
   c. visually comparing the calculated absolute position and the true visual position of the at least one transceiver means,
   d. changing the initial map border coordinates, and
   e. repeating steps a, b, and c until the calculated absolute position and the true visual position of the at least one transceiver means on a map coincides visually on the map.

24. The system of claim 21, wherein the location information with respect to an absolute positioning system about the at least one transceiver means in the wireless network area for commencing the dynamic online automatic prediction of the signal strength and positioning of the at least one wireless-enabled device is determined, the system comprises:
   a. at least one absolute positioning system accessible only from the borders of the wireless network area, and
   b. the at least one processor is capable of:
      i. calculating the locations of the at least one transceiver means located at the borders of the wireless network area where the absolute positioning system is accessible using the absolute positioning system,
      ii. using the calculated locations of the at least one transceiver means located at the borders of the wireless network area to predict the received signal strength of the at least one transceiver means located at the borders of the wireless network area at any location in the wireless network area,
      iii. comparing the received signal strength of signals transmitted by the at least one transceiver means located at the borders of the wireless network area and received by the at least one transceiver means located inside the borders of the wireless network area with the predicted signal, and
      iv. calculating the position of the at least one transceiver means located inside the borders of the wireless network area using trilateration or signal strength best match positioning methods.

25. The system of any one of claims 1 to 5 wherein the at least one processor is further configured to rank the at least one transceiver means according to the positioning discrimination significance by:
   a. obtaining a power profile of the at least one transceiver means,
   b. merging all power profiles of all the at least one transceiver means to construct a radio-map of the area,
   c. applying a principle component analysis to the constructed radio map, and
   d. ranking the at least one transceiver means according to the positioning discrimination significance of each.

26. The system of claim 25 wherein the ranking of the plurality of transceivers means in the wireless area network is calculated by:
   a. obtaining the principle component analysis transformation matrix, wherein the matrix comprises columns and each column has a number of elements equal to the number of the plurality of transceivers means in the wireless area network, and
   b. ranking, for each column in the principle component analysis transformation matrix, the plurality of transceivers according to their corresponding absolute numerical values in that column of the principle component analysis transformation matrix.

27. The system of claim 25 wherein the ranking of the at least one transceiver means is used to calculate an accuracy measure of a position of a wireless-enabled device calculated using received signals strength from the at least one transceiver means.

28. A method that builds a model for predicting the received signal strength at any location within a wireless network area of a signal transmitted by at least one transceiver means, the method comprising:
   a. obtaining an online power pattern from the at least one transceiver means that constitutes the infrastructure of the wireless network, the power pattern comprises:
      i. information that identifies the at least one transmitting transceiver means, and information that identifies any other transceiver means in the area and visible by the at least one transmitting transceiver means,
      ii. power information for a signal transmitted by the at least one transmitting transceiver means, and
      iii. received signal strength information of signal transmitted by the any other transceiver means in the area and visible by the at least one transmitting transceiver means, and
   b. receiving the power pattern transmitted from each of the at least one transceiver means and,
      i. processing the information that identifies the at least one transceiver means to locate the at least one transceiver means, and
      ii. automatically and dynamically building the model online for predicting received signal strength of a signal transmitted by the at least one transceiver means at any location within the area
wherein the power patterns transmitted by the at least one transceiver means are broadcasted wirelessly or transmitted through a wired network to the at least one processor.

29. The method of claim 28, wherein the method further comprises building one of the following models to predict the signal strength of the at least one transceiver means at any location within the wireless network area:
   a. an online propagation model of the at least one transceiver means wherein the propagation model relates the received signal strength from the at least one transceiver means to a distance from the at least one transceiver means;
   b. an online power profile of the at least one transceiver means wherein the power profile relates the received signal strength from the at least one transceiver means to a location in the wireless network area, or c. a combination of the propagation model and the online power profile of the at least one transceiver means.

30. The method of claim 29, wherein the online models for predicting the signal strength of the at least one transceiver means are built using an adaptive, calibrated, best-fit mathematical formula calibrated dynamically online based on the information in the power patterns.

31. The method of claim 29, wherein the online models for predicting the signal strength of the at least one transceiver means are built using an adaptive, calibrated conditional probabilistic approach where the prediction of the signal strength at any distance from the at least one transceiver means or at any location in the wireless network area is modeled as the probability of the signal strength conditioned on, or given, the signal strength information in the power patterns.

32. The method of claim 29, wherein the online models for predicting the signal strength of the at least one transceiver means are built using the combination of an adaptive, calibrated hybrid approach that combines a best fit mathematical model to dynamically estimate a general pattern of the received signal strength and a conditional probabilistic approach to estimate residual signal strength errors that cannot be modeled using the best fit mathematical model.

33. The method of any of claims from 28 to 32, wherein the online models for predicting the signal strength of the at least one transceiver means undergo online, automatic, dynamic, and adaptive verification and correction to adapt to any change in the wireless network area.

34. The method of claim 33, wherein the verification and the correction of the models occurs periodically.

35. The method of any one of claims 28 to 32, wherein the method further comprises calculating an accuracy measure of the predicted signal strength.

36. The method of claim 35, wherein the at least one processor is further programmed to calculate the accuracy measure of the predicted signal strength by:

a. calculating a conditional probability of the signal strength conditioned on, or given, the information in the power patterns, b. calculating a variance of the conditional probability, and c. converting the variance into an accuracy measure of the predicted received signal strength.

37. The method of any one of the claims 28 to 32, wherein the at least one processor is further programmed to determine a location for each of the at least one transceiver means using:

a. a table containing the location of each of the at least one transceiver means indexed by the information that identifies the at least one transceiver means, or b. by encoding the location of each of the at least one transceiver means in the power patterns transmitted by the at least one transceiver means.

38. The method of any one of claims 28 to 32 wherein the method further comprises positioning at least one wireless-enabled device differently from the at least one transceiver means that constitutes the infrastructure of the wireless network, the method comprising:

a. at least one wireless-enabled device configured to receive the signal from some of the at least one transceiver means and producing a power fingerprint output indicative thereof comprising:

i. information that identifies the at least one transceiver means visible by the at least one wireless-enabled device, and ii. received signal strength information about the at least one transceiver means visible by the at least one wireless-enabled device, comparing the signal strength predicted by the online models with the power fingerprint received from the wireless-enabled device to calculate a position of the wireless-enabled device.

39. The method of claim 38, wherein the online models for predicting the signal strength of the at least one transceiver means at any location within the wireless network is one of the following models:

a. an online propagation model of the at least one transceiver means, wherein the propagation model relates the received signal strength from the at least one transceiver means to a distance from the at least one transceiver means, b. an online power profile of the at least one transceiver means wherein the power profile relates the received signal strength from the at least one transceiver means to a location in the wireless network area, or a. a combination of an online propagation model and an online power profile of the at least one transceiver means.

40. The method of claim 38 where the at least one wireless-enabled device receives the calculated position calculated through one of the following options:

a. through a wireless communication between the at least one processor and the at least one wireless-enabled device, b. through a wired communication between the at least one processor and the at least one wireless-enabled device, or c. by embedding the at least one processor inside the at least one wireless-enabled device in a single device.

41. The method of claim 38, wherein the method further comprises dynamically calculating a position of the at least one wireless-enabled device by:

a. using the online models for predicting signal strength of the at least one transceiver means at any location within the wireless network area and the power fingerprint of the at least one wireless-enabled device to estimate a distance between the wireless enabled device and the at least one known location transceiver means, and a. performing a trilateration operation to calculate a position of the at least one wireless-enabled device.

42. The method of claim 38, wherein the method further comprises dynamically calculating a position of the at least one wireless-enabled device by:

a. using the online models for predicting the signal strength of the at least one transceiver means at any location within the wireless network area and the power fingerprint of the at least one wireless enabled device, b. searching for the location at which the predicted signal strength is best-matched with the signal strength in the power fingerprint of the at least one wireless-enabled device, and a. providing this best-matched location as the calculated position of the wireless-enabled device.

43. The method of claim 38, wherein the method further comprises dynamically calculating a position of the at least one wireless-enabled device by using a hybrid positioning technique which combines a trilateration method and a best-matched signal strength method; wherein the trilateration method comprises:

a. using the online models for predicting signal strength of the at least one transceiver means at any location within the wireless network area and the power fingerprint of the at least one wireless-enabled device to estimate a distance between the wireless enabled device and the at least one known location transceiver means; and b. performing a trilateration operation to calculate a position of the at least one wireless-enabled device;

and wherein the best-matched signal strength method comprises:

a. using the online models for predicting the signal strength of the at least one transceiver means at any location within the wireless network area and the power fingerprint of the at least one wireless enabled device;

b. searching for the location at which the predicted signal strength is best-matched with the signal strength in the power fingerprint of the at least one wireless-enabled device; and c. providing this best-matched location as the calculated position of the wireless-enabled device.

44. The method of claim 38, wherein the method further comprises calculating an accuracy measure of the calculated position of the at least one wireless-enabled device.

45. The method of claim 44, wherein the method further comprises calculating an accuracy measure of the calculated position of the wireless-enabled device by:

a. calculating a conditional probability variance of the predicted signal strength that matches the received signal strength contained in the power fingerprint of the at least one wireless-enabled device, b. converting this variance into a distance accuracy measure using a mathematical formula, c. forming a covariance matrix of the estimated distances between the at least one wireless-enabled device and the at least one transceiver means, this covariance matrix is diagonal matrix where diagonal elements contains the said calculated distance accuracy measures, and d. calculating an accuracy measure of the positioning using the trilateration method.

46. The method of claim 44, wherein the method further comprises calculating an accuracy measure of the calculated position of the wireless-enabled device by:

a. calculating a conditional probability variance of the predicted signal strength that matches the received signal strength contained in the power fingerprint, b. converting this variance into a location accuracy measure, c. searching for the location at which the predicted signal strength is best-matched with the signal strength in the power fingerprint of the at least one wireless-enabled device, and d. calculating an accuracy measure of the calculated positioning using the calculated accuracy measure of the locations at which the predicted signal strength is best-matched with the signal strength in the power fingerprint of the at least one wireless-enabled device.

47. The method of claim 44, wherein the method further comprises calculating an accuracy measure of the calculated position of the wireless-enabled device by ranking the at least one transceiver means according to its positioning discrimination significance by:

a. obtaining a power profile of the at least one transceiver means, b. merging all power profiles of all the at least one transceiver means to construct a radio-map of the area, c. applying a principle component analysis to the constructed radio map, d. ranking the at least one transceiver means according to the positioning discrimination significance of each and, e. using this calculated ranking to calculate an accuracy measure of the calculated position of the wireless-enabled device calculated using received signals strength from the at least one transceiver means.

48. The method of any one of the claims 28 to 32 wherein the method further comprises calculating the location of each of the at least one transceiver means.

49. The method of any one of claims 28 to 32 wherein the location information about the at least one transceiver means in the wireless network area which is needed to start the dynamic online automatic prediction of signal strength of the at least one transceiver means is calculated, the method comprises:

a. at least one wireless network-enabled device doing the following:

i. surveying the area by receiving transmitted signals from the at least one transceiver means at different known locations with respect to any local coordinate system in the wireless network area, the signal comprising identification information of the at least one transceiver means, and ii. producing a power profile indicative thereof, the power profile output comprising information linking the received signal strength and the known location of the device when the signal is received by the device, and b. utilizing the power profile output to determine the location of the at least one transceiver means with respect to the any local coordinate system by:

i. determining the location with respect to any local coordinate system of the at least one transceiver means as the location at which the received signal strength of the at least one transceiver means is maximum, ii. re-survey the area around the said determined location with higher resolution, iii. determining the location of the at least one transceiver means as the location at which the received signal strength of the at least one transceiver means is maximum, and iv. repeating steps b.i to b.ii as needed until accepted location resolution is obtained.

50. The method of claim 49, wherein the location information about the at least one transceiver means in the wireless network area is calculated with respect to an absolute global coordinate system without having any absolute positioning system by:

a. considering the calculated local-coordinate locations of the at least one transceiver means as initial local-coordinated locations, b. converting the said initial local-coordinated into an absolute positioning coordinate system using a tool with a map of the area with initial map border coordinates are estimated with respect to the absolute coordinate system, c. comparing visually on the map the calculated absolute position and the true visual position of the at least one transceiver means, d. changing the initial map border coordinates, and e. repeating steps a, b, and c until the calculated absolute position and the true visual position of the at least one transceiver means on a map coincides visually on the map.

51. The method of any one of claims 28 to 32 wherein the location information with respect to an absolute positioning system about the at least one transceiver means in the wireless network area which is needed to start the dynamic online automatic prediction of signal strength and positioning of the at least one wireless-enabled device is determined, the method comprises:
   a. having at least one absolute positioning system accessible only from the borders of the wireless network area,
   b. calculating the locations of the at least one transceiver means located at the borders of the wireless network area where the absolute positioning system is accessible using the absolute positioning system,
   c. using the calculated locations of the at least one transceiver means located at the borders of the wireless network area to predict the received signal strength of the said at least one transceiver means located at the borders of the wireless network area at any location in the wireless network area,
   d. comparing the received signal strength of signals transmitted by the at least one transceiver means located at the borders of the wireless network area and received by the at least one transceiver means located inside the borders of the wireless network area with the predicted signal, and
   e. calculating the position of the at least one transceiver means located inside the borders of the wireless network area using trilateration or signal strength best match positioning methods.

52. The method of any one of claims 28 to 32, wherein the method further comprises ranking the at least one transceiver means according to the positioning discrimination significance by:
   a. obtaining a power profile of the at least one transceiver means,
   b. merging all power profiles of all the at least one transceiver means to construct a radio-map of the area,
   c. applying a principle component analysis to the constructed radio map, and
   d. ranking the at least one transceiver means according to the positioning discrimination significance of each.

53. The method of claim 52, wherein the ranking of the plurality of transceivers means in the wireless area network is calculated by:
   a. obtaining the principle component analysis transformation matrix, wherein the matrix comprises columns and each column has a number of elements equal to the number of the plurality of transceivers means in the wireless area network, and
   a. ranking, for each column in the principle component analysis transformation matrix, the plurality of transceivers according to their corresponding absolute numerical values in that column of the principle component analysis transformation matrix.

54. The method of claim 52, wherein the ranking of the at least one transceiver means is used to calculate an accuracy measure of a position of a wireless-enabled device calculated using received signals strength from the at least one transceiver means.

55. The system of claim 12 wherein the at least one wireless-enabled device receives the position calculated by the at least one processor through one of the following options:
   a. through a wireless communication between the at least one processor and the at least one wireless-enabled device,
   b. through a wired communication between the at least one processor and the at least one wireless-enabled device, or
   c. by embedding the at least one processor inside the at least one wireless-enabled device in a single device.

56. The method of claim 39 where the at least one wireless-enabled device receives the calculated position calculated through one of the following options:
   a. through a wireless communication between the at least one processor and the at least one wireless-enabled device,
   b. through a wired communication between the at least one processor and the at least one wireless-enabled device, or
   c. by embedding the at least one processor inside the at least one wireless-enabled device in a single device.

* * * * *